United States Patent
Liao et al.

(10) Patent No.: US 10,585,927 B1
(45) Date of Patent: Mar. 10, 2020

(54) DETERMINING A SET OF STEPS RESPONSIVE TO A HOW-TO QUERY

(71) Applicant: Google Inc., Mountain View, CA (US)

(72) Inventors: Kerwell Liao, San Francisco, CA (US); Nikhil Sharma, Mountain View, CA (US); LaDawn Risenmay Jentzsch, Mountain View, CA (US); Jennifer Ellen Fernquist, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 122 days.

(21) Appl. No.: 15/447,235

(22) Filed: Mar. 2, 2017

Related U.S. Application Data

(63) Continuation of application No. 13/927,545, filed on Jun. 26, 2013, now abandoned.

(51) Int. Cl.
| | |
|---|---|
| *G06F 16/00* | (2019.01) |
| *G06F 16/338* | (2019.01) |
| *G06F 16/33* | (2019.01) |
| *G06F 16/30* | (2019.01) |
| *G06Q 30/02* | (2012.01) |

(52) U.S. Cl.
CPC ........ *G06F 16/338* (2019.01); *G06F 16/3349* (2019.01); *G06Q 30/02* (2013.01)

(58) Field of Classification Search
CPC combination set(s) only.
See application file for complete search history.

(56) References Cited

U.S. PATENT DOCUMENTS

| | | | |
|---|---|---|---|
| 6,658,598 B1 * | 12/2003 | Sullivan | G06F 11/2294 714/25 |
| 9,053,423 B2 | 6/2015 | Proux | |
| 9,183,072 B1 * | 11/2015 | Makuch | G06F 11/0709 |
| 2003/0011629 A1 * | 1/2003 | Rouse | G06F 16/40 715/705 |
| 2003/0115191 A1 | 6/2003 | Cooperman et al. | |
| 2005/0080782 A1 | 4/2005 | Ratnaparkhi et al. | |
| 2006/0200371 A1 * | 9/2006 | Spector | G06N 5/00 706/45 |
| 2008/0005075 A1 | 1/2008 | Horvitz et al. | |
| 2008/0104037 A1 | 5/2008 | Biemer | |
| 2008/0235179 A1 | 9/2008 | Kurien et al. | |
| 2008/0294423 A1 | 11/2008 | Castellani et al. | |

(Continued)

*Primary Examiner* — Polina G Peach
(74) *Attorney, Agent, or Firm* — Middleton Reutlinger

(57) ABSTRACT

Methods and apparatus related to providing steps for completing a task based on analysis of multiple sources. A how-to query related to performing a task and a plurality of sources related to the how-to query may be identified. A set of steps related to performing the task may be determined based on analysis of the plurality of sources that are related to the how-to query, optionally including determining a confidence measure for the plurality of sources. The set of steps may be associated with the how-to query in a database. The set of steps may be provided to a user in response to the how-to query submitted by the user. In some implementations the analysis of the plurality of sources that are related to the how-to query may include comparing components of different sets of steps and identifying the common elements to determine a set of steps.

15 Claims, 5 Drawing Sheets

(56) References Cited

U.S. PATENT DOCUMENTS

| | | |
|---|---|---|
| 2009/0089044 A1 | 4/2009 | Cooper et al. |
| 2009/0100381 A1* | 4/2009 | McAfee .................. G06Q 30/02 |
| | | 715/855 |
| 2009/0106224 A1 | 4/2009 | Roulland et al. |
| 2009/0150387 A1 | 6/2009 | Marchewitz |
| 2009/0157617 A1 | 6/2009 | Herlocker et al. |
| 2009/0183237 A1 | 7/2009 | Cortes et al. |
| 2009/0187572 A1 | 7/2009 | Ives et al. |
| 2010/0077008 A1* | 3/2010 | Davis ....................... G06F 16/93 |
| | | 707/797 |
| 2010/0332500 A1* | 12/2010 | Pan ....................... G06F 16/951 |
| | | 707/759 |
| 2011/0035402 A1* | 2/2011 | Agrawal ........... G06F 17/30864 |
| | | 707/769 |
| 2011/0055699 A1* | 3/2011 | Li ......................... G06F 16/951 |
| | | 715/709 |
| 2011/0179024 A1* | 7/2011 | Stiver ............... G06F 16/24578 |
| | | 707/728 |
| 2011/0302521 A1* | 12/2011 | Jiang ..................... G06F 3/0481 |
| | | 715/779 |
| 2012/0042002 A1 | 2/2012 | Smith et al. |
| 2012/0078837 A1 | 3/2012 | Bagchi et al. |
| 2013/0007033 A1* | 1/2013 | Brown ..................... G06F 17/28 |
| | | 707/764 |
| 2013/0097179 A1* | 4/2013 | Moshrefi ............. G06F 16/9535 |
| | | 707/748 |
| 2013/0117204 A1 | 5/2013 | Vadlamani et al. |
| 2013/0117668 A1 | 5/2013 | Joseph et al. |
| 2013/0132357 A1* | 5/2013 | Edgar ............... G06F 17/30864 |
| | | 707/706 |
| 2013/0262568 A1 | 10/2013 | Raffel et al. |
| 2013/0275392 A1* | 10/2013 | Bhatt ................. G06F 16/3331 |
| | | 707/692 |
| 2014/0136519 A1* | 5/2014 | Latzina ................. G06F 16/951 |
| | | 707/722 |
| 2014/0259017 A1* | 9/2014 | Murray .................. G06Q 10/10 |
| | | 718/102 |
| 2014/0280087 A1* | 9/2014 | Isensee ............... G06F 16/2455 |
| | | 707/723 |

* cited by examiner

| Query Number | How-to Query | Prefix | Keywords and/or key phrases |
|---|---|---|---|
| 1 | how to remove tar from clothing | how to | "remove tar", "clothing" |
| 2 | how can I remove tar from clothing? | how can I | "remove tar", "clothing" |
| 3 | how do I remove tar from fabric | how do I | "remove tar", "fabric" |
| 4 | remove tar stains | Missing prefix | "remove tar", "stains" |
| 5 | stain buster – tar | Missing prefix | "stain buster", "tar" |

FIG. 2

| Source A |
|---|
| A1 |
| A2 |
| A3 |

| Source B |
|---|
| B1 |
| B2 |
| B3 |
| B4 |

| Source C |
|---|
| C1 |
| C2 |
| C3 |

| Group | Steps | Selected Step(s) |
|---|---|---|
| First | A1, B1, B2, C1 | B2 |
| Second | A2, B3, C2 | A2, B3 |
| Third | A3, B4, C3 | C3 |

Determined Set of Steps

DETERMINING A SET OF STEPS RESPONSIVE TO A HOW-TO QUERY

BACKGROUND

This specification is directed generally to providing step-by-step instructions for completing a task based on analysis of multiple sources.

Users often search for step-by-step instructions on how to perform a task and may be presented with multiple sources of information related to performing the task.

SUMMARY

The present disclosure is directed to methods and apparatus providing step-by-step instructions for completing a task based on analysis of multiple sources. A how-to query related to performing a task and a plurality of sources related to the how-to query may be identified. A set of steps may be determined that may enable a user to perform the task. The determination of the set of steps may be based on analysis of the plurality of sources that are related to the how-to query, including determining a confidence measure for one or more of the plurality of sources. The set of steps may be associated with the how-to query in a database. The set of steps may be provided to a user in response to the how-to query being submitted by the user and/or in response to a similar how-to query being submitted by the user. In some implementations the analysis of the plurality of sources that are related to the how-to query may include comparing components of different sets of steps and identifying common elements to determine a set of steps.

In some implementations a computer implemented method may be provided that includes the steps of: identifying a how-to query related to performing a task; identifying a plurality of sources responsive to the how-to query; determining a confidence measure for one or more of the plurality of identified sources, the confidence measure of a given source indicative of effectiveness of the given source in providing steps for the task of the how-to query; determining a set of steps to perform the task based on the confidence measures for one or more of the plurality of identified sources; and associating the set of steps with the how-to query and storing the set of steps to be provided in response to the how-to query.

This method and other implementations of technology disclosed herein may each optionally include one or more of the following features.

In some implementations identifying the plurality of sources may include identifying a user manual and including the user manual as one of the sources. In some implementations the set of steps to perform the task may be based on the user manual.

The method may further comprise: identifying one or more groups of steps from the plurality of sources; identifying one or more steps from each group of steps; and determining the set of steps to perform the task based on the identified one or more steps. In some implementations the method may further comprise: determining similarity measures between the steps from the plurality of sources; and determining the one or more groups of steps based on the similarity measures. The similarity measures are based on one or more of keyword matching, phrase matching, parse-tree matching, distributional similarity scores, and edit distance scores. In some implementations the method may further comprise: determining, for each step in each group of steps, a relevance score indicative of the confidence level of the step; and identifying the one or more steps from the group of steps based on the relevance scores.

In some implementations determining the confidence measure for a given source in the plurality of identified sources may be based on one or more of a ranking of the given source, frequency of visits to the given source, number of links to the given source, cohesiveness of the given source, and user feedback related to the given source.

In some implementations determining the set of steps to perform the task may include determining one or more steps in the set of steps from a source based on the confidence measure of the source.

The method may further comprise receiving a submitted query and providing the determined set of steps in response to the submitted query, the submitted query related to the how-to query. In some implementations the method may further comprise determining a quality measure for the determined set of steps provided in response to the submitted query. The method may further comprise: determining a query score for the submitted query, the query score indicative of confidence that the submitted query indicates a desire to receive steps for completing a task indicated by the submitted query; and providing the determined set of steps in response to the submitted query based on the query score for the submitted query.

The method may further comprise determining one or more of a skill level required to perform the task, time duration for performing the task, a list of tools needed to perform the task, and a list of materials needed to perform the task.

In some implementations identifying the how-to query may include one or more of identifying task terms in the how-to query and identifying search results related to the how-to query.

In some implementations identifying the how-to query may be based on one or more user-initiated actions.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine a set of steps to perform a task. Particular implementations of the subject matter described herein may associate the set of steps with a how-to query and store the set of steps to be provided in response to the how-to-query. Particular implementations of the subject matter described herein may provide the set of steps in response to the how-to-query.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 2 is an example table illustrating the identification of how-to queries.

FIG. 3 is an example illustrating the identification of one or more steps to perform a task from a plurality of sources.

DETAILED DESCRIPTION

Technology described herein is useful in determining a set of steps to perform a task, and more particularly, to associating the set of steps to perform the task with a how-to query and storing the set of steps to be provided in response to the how-to-query. In some implementations the set of steps may be provided in response to the how-to-query.

Figure 1:
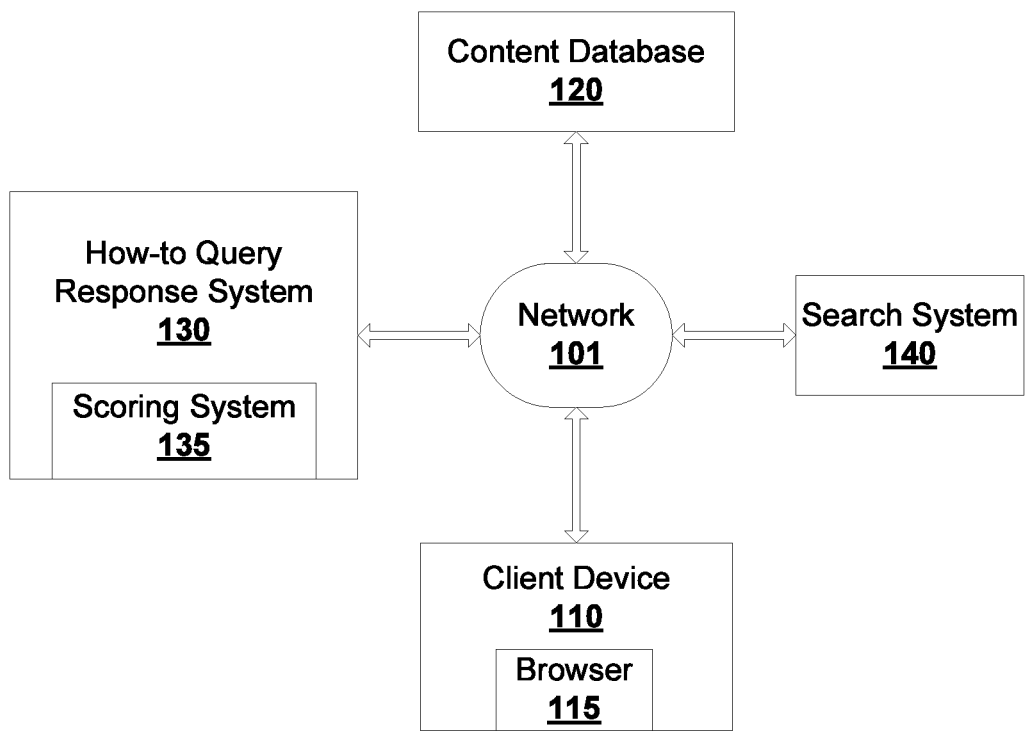
FIG. 1 is a block diagram of an example environment in which a set of steps to perform a task may be associated with a how-to query and stored to be provided in response to the how-to query.

FIG. 1 illustrates a block diagram of an example environment 100 in which a set of steps to perform the task may be associated with a how-to query and stored to be provided in response to the how-to query. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 may also include a client device 110, a content database 120, a how-to query response system 130, and a search system 140. The client device 110 may execute one or more applications, such as a web browser 115. The client device 110 may be, for example, a desktop computer, a laptop, a tablet computer, a mobile phone, a tablet computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices of the user may be provided. In some implementations the how-to query response system 130 may include a scoring system 135. In some environments the how-to query response system 130 and the scoring system 135 may be separate components of the environment 100.

A how-to query is a search query that identifies a task and that indicates a desire for information that may be utilized in performing the task. How-to queries include one or more task terms that identify a task and optionally include one or more inquiry terms that indicate a desire for instructions related to performing the task. For example, "how to remove tar from clothing" is an example of a how-to query that includes task terms ("remove tar from clothing") that identify the task of removing tar from clothing and includes inquiry terms ("how to") that are indicative of a desire for information that may be utilized in removing tar from clothing. As another example, "how do I change a car tire" is an example of a how-to query that includes task terms ("change a car tire") that identify the task of changing a car tire and includes inquiry terms ("how do I") that are indicative of a desire for information that may be utilized in changing a car tire.

A query may be identified as a how-to query by the how-to query response system 130 utilizing one or more techniques such as those disclosed herein. In some implementations a how-to query may be identified as a how-to query based on one or more key terms and/or key phrases that may be included in the query. For example, a query may be identified as a how-to query based on matching a prefix of the query to one or more inquiry terms. The prefix of a query is a sequence of one or more terms occurring at the beginning of a query. Inquiry terms includes phrases such as "how to", "how do I", "how does one", "does anyone know", "where do I find instructions to", "where can I get instructions to", "can someone tell me", "teach me to", and "tell me how" and/or terms such as "how", "where", "instructions" and "?". In some implementations the how-to query response system 130 may identify a query as a how-to query if it includes a prefix with one or more inquiry terms and also includes one or more additional terms following the prefix. In some implementations matching a prefix of the query to one or more inquiry terms may be combined with additional techniques, such as those disclosed herein, in determining if a query is a how-to query.

Also, for example, a query may be identified as a how-to query based on matching one or more terms of the query to one or more inquiry terms and also matching one or more terms of the query to one or more task terms. In some implementations the how-to query response system 130 may identify a query as a how-to query if it includes one or more inquiry terms and also includes one or more task terms. For example, the query "change flat tire?" may be identified as a how-to query based on matching of the terms "change flat tire" to the task phrase "changing a flat tire" and matching of the term "?" to the inquiry term "?". Also, for example, the query "remove tar instructions" may be identified as a how-to query based on matching of the terms "remove tar" to the task phrase "removing tar" and matching of the term "instructions" to the inquiry term "instructions". Exact matching and/or soft matching between terms of a query and inquiry terms and/or task terms may be utilized. In some implementations a list of key terms and/or key phrases (including task terms and/or inquiry terms) that may be frequently included in how-to queries may be stored in a database, such as content database 120. For example, the database may include a list of inquiry terms and a list of task terms that may be utilized in identifying how-to queries. In some implementations a listing of task terms may be identified based part-of-speech tagging, semantic analysis, syntactic analysis, and/or other techniques.

In some implementations the frequency of inquiry terms and/or task terms that are included in a query may be utilized in determining if a query is a how-to query. For example, in some implementations data related to the frequency of key terms and/or key phrases (e.g., frequency in queries and/or frequency across another corpus of documents) may optionally be stored in the content database 120 and utilized in determining if a query is a how-to query. For example, in some implementations a query may only be identified as a how to query if it includes one or more inquiry terms and includes one or more task terms that are associated with at least a threshold frequency. For example, "how do I make a cake from scratch" may only be identified as a how-to query if the task terms "make a cake from scratch" occur with at least a threshold level of frequency in past queries. Thresholding based on frequency of one or more task terms in past queries may enable only queries associated with tasks that are searched for with at least a threshold level of frequency to be identified as how-to queries.

In some implementations the frequency of submission of a query may be utilized in determining if a query is a how-to query. In some implementations data related to the frequency of submission of queries having the key terms and/or key phrases of a query may optionally be stored in the content database 120 and utilized in determining if a query is a how-to query. For example, in some implementations a query may only be identified as a how-to query if it has been submitted with at least a threshold level of frequency. For example, "how do I make a cake from scratch" may only be identified as a how-to query if the query (and optionally variants thereof) constitutes at least threshold level of queries in a record of past queries. Thresholding based on frequency of submission of queries may enable only queries that are submitted with at least a threshold level of frequency to be identified as how-to queries.

In some implementations the how-to query response system 130 may identify and associate similar how-to queries with one another and store the associations in a database such as content database 120. Similar how-to queries may be queries that indicate a desire for information to generally perform similar tasks. For example, "how to remove tar from clothing", "how can I remove tar from clothing?", "how to remove tar from fabric", "remove tar stains", and "stain buster—tar" may be identified as similar how-to queries because they indicate a desire for information to generally remove tar. As another example, "how do I change a tire?", "how to change a flat tire", "how to change a tire step by step", "changing a tire", and "change a flat" may be identified as similar how-to queries because they indicate a desire for information to generally change a car tire. In some implementations similar how-to queries may be identified based on comparison of their respective inquiry terms and/or task terms.

Additional and/or alternative methods may be utilized in identifying a how-to query such as methods based on analysis of search results and/or search result documents related to the how-to query. For example, one or more search results responsive to a query may be analyzed to determine if the search result is associated with a search result document that provides steps related to performing a task identified by the query. For example, in some implementations the first X highest ranked search results responsive to a query may be analyzed to determine if at least a threshold number of such search result documents provide steps related to performing a task identified by the query. Also, for example, in some implementations the search result document associated with the search result having the highest selection rate for a query may be analyzed to determine if the search result document associated with the search result provides steps related to performing a task identified by the query.

In some implementations similar queries may be identified by the how-to query response system 130 by utilizing one or more methods including keyword matching, phrase matching, and/or contextual similarity matching of phrases. Additional and/or alternative methods may be utilized such as methods based on determining similarities between respective search results and/or search result documents related to the how-to queries. In some implementations determination of whether two or more queries are similar may be based exact matching of inquiry terms and/or exact matching of task terms for the respective how-to queries. In some implementations the determination of whether two or more how-to queries are similar may be based on soft matching of the inquiry terms and exact matching of the task terms. In some implementations the determination that two how-to queries are similar may be based on exact matching of the inquiry terms and soft matching of the task terms. In some implementations soft matching between terms and/or phrases may be based on determining an edit distance between the terms and/or phrases and comparing that to a threshold. In some implementations soft matching between terms and/or phrases may be based on comparing canonicalized versions of terms and/or phrases. For example, the inquiry terms could be stemmed and their stop words removed, before matching. Stop words include words that are common and may include articles such as "a", "an," "and," and "the"; prepositions such as "of," "to" and "for"; auxiliary verbs such as "have" and "were"; and/or typical initial words in questions such as "who", "how" and "where". In some implementations soft matching between terms and/or phrases may be based on semantic analysis. For example, a term may be considered to match with one or more synonyms for the term.

Additional and/or alternative matching techniques may be utilized. For example, the similarity between terms may be based on the semantic distance, or length of path along edges between the terms in an external resource such as a lexical database. The lexical database may include key terms and/or phrases including words, nouns, adjectives, verbs, adverbs, etc. and their conceptual and/or semantic inter-relationships. In some implementations the key terms and/or phrases may be grouped based on the meaning of the key terms and/or phrases, and/or their syntactic relationships to other key terms and/or phrases. In some implementations a database such as content database 120 may include distributionally similar inquiry terms and/or task terms and their corresponding distributional similarity scores. Phrases that typically occur in similar contexts may for example be considered to have similar meanings. For example, a first phrase that co-occurs with the same words as that of a second phrase over a collection of documents, such as html web pages, may be considered to be distributionally similar to the second phrase. Identifying two or more queries as similar may be utilized in one or more steps of methods described herein. For example, queries may be grouped together in determining if a collective frequency of query is great enough to constitute identifying such queries as how-to queries and determining a set of steps to perform a task identified by such queries. Also, for example, identification of sources for determining the set of steps and/or any ranking associated with such sources may be based on a ranking of the sources for each of multiple similar queries. Also, for example, associating a set of steps with a how-to query may include associating the set of steps with similar how-to query.

Referring to FIG. 2, an example table illustrates the identification of how-to queries. The query "how to remove tar from clothing" has inquiry terms "how to" and task terms "remove tar", "clothing". The inquiry term "how to" identifies the query as a query seeking information related to performing a task. The task terms "remove tar" and "clothing" identify the task. As discussed herein, in some implementations the inquiry terms and/or the task terms may be identified by the how-to query response system 130 based in part on comparing the terms with stored entries in a database, such as content database 120. The stored entries may include, for example, terms that frequently occur in how-to queries. As another example, the query "how can I remove tar from clothing?" has inquiry terms "how can I" and task terms "remove tar" and "clothing". As another example, the query "how do I remove tar from fabric" has inquiry terms "how do I" and task terms "remove tar" and "fabric". As another example, the query "remove tar stains?" has an inquiry term "?" and task terms "remove tar" and "stains". The query "stain buster—tar" does not have inquiry terms. However in some implementations the how-to query response system 130 may identify this query as a how-to query based at least in part on the task terms "stain buster" and "tar".

In some implementations similar how-to queries may be identified among the queries of FIG. 2 based on a matching of terms and/or other techniques. For example, the words "clothing" (queries 1 and 2) and "fabric" (query 3) may be determined to be similar based on their shared semantics. In some implementations the how-to query response system 130 may identify that the words "remove" and "tar" appear in the first four queries. Based at least in part on such identifications, the how-to query response system 130 may identify that the first four how-to queries are similar to one another. Additionally and/or alternatively, the how-to query response system 130 may identify that the words "tar" and "stains" appear in the fourth and fifth queries, and that the words "remove" and "buster" are similar based on their shared semantics. Based at least in part on such determinations, the how-to query response system 130 may identify that the fourth and fifth how-to queries are similar to one another. Accordingly, in some implementations the how-to query response system 130 may identify that all five how-to queries are similar to one another. In some implementations the how-to queries and their identified associations with one another may be stored in content database 120.

In some implementations content database 120 may include a collection of how-to queries issued by users. In some implementations, for each of a plurality of tasks, content database 120 may include data indicative of a number of queries that have been issued that are related to performing the task. In some implementations a how-to query related to performing a task may be identified by the how-to query response system 130 based on a threshold number of queries issued by users that are related to performing the task. For example, the threshold percentage may be identified as 0.2%—that is, at least 0.2% of all issued queries during a specified time interval have to relate to performing a task in order for a query related to the task to be identified as how-to query. For example, the how-to query response system 130 may access content database 120 to identify that queries similar to the query "how to remove tar from clothing" constituted 0.1% of all queries that were issued during the specified time interval. Accordingly, having failed to satisfy the threshold percentage of 0.2%, queries similar to the query "how to remove tar from clothing" may not be identified as how-to queries by the how-to query response system 130. As another example, the how-to query response system 130 may access content database 120 to identify that the queries similar to the query "how do I change a tire" constituted 0.6% of all queries that were issued during the same time interval. Accordingly, having satisfied the threshold percentage of 0.2%, queries similar to the query "how do I change a tire" may be identified as how-to queries by the how-to query response system 130.

In some implementations the content database 120 may optionally include time stamp data and/or session identification data that facilitate grouping of queries, videos, documents, users, computing devices, and/or other sources of information. In some implementations the content database 120 may only include past queries having submission rates above a certain threshold. In some implementations the content database 120 may only include data that satisfies a time threshold. For example, any queries that are more than a year old may not be stored in the content database 120. Additional restrictions may optionally apply to any stored data such as the exclusion of blacklisted queries and/or the exclusion of how-to queries not issued by more than a predetermined number of users. The content database 120 may be collectively stored in one or more computers and/or storage devices.

In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

In some implementations users may interact with the search system 140 through one or more client devices 110. The client devices 110 and the search system 140 may each include memory for storage of data and software applications, a processor for accessing data and executing applications, and components that facilitate communication over the communication network 101. The client devices 110 may execute applications, such as web browsers (e.g., web browser 115 executing on client device 110), that allow users to formulate how-to queries and submit them to the search system 140. The search system 140 may receive how-to queries from one or more client devices 110 and may execute the how-to queries against a content database 120 of available documents such as web pages, images, text documents, and multimedia content. The search system 140 may identify content which matches the how-to queries, and may respond by generating search results that are provided to the one or more client devices 110 in a form that can be presented to the users. For example, in response to a how-to query from the client device 110, the search system 140 may provide a search results web page to be displayed in the web browser 115 executing on the client device 110.

In some implementations the identification of a how-to query may be based on identifying one or more user-initiated actions. In some implementations the content database 120 may store data that is indicative of a user-initiated action. The user-initiated actions may include, for example, a purchase made by the user, selections made by the user of search results provided by the search engine, resources visited by the user, a download initiated by the user, a search query issued by the user, a post by the user on a social networking platform, a locational query issued by the user, a location check-in by the user, an email communication, and so on. The term "check-in", as used herein, includes a user-approved and/or user-initiated indication of a visit to a location. For example, a user at a Location A may be provided, via a mobile computing device, with an option to verify that the user is at Location A. For example, the option to verify may be in the form of a prompt provided to the user, such as, for example, "Would you like to check-in to your current location?" along with a list of selectable options including "Location A", "Location B", and "Location C". The user may select "Location A" in response to the prompt to check-in to Location A. Also, for example, a user may choose to automatically check-in to one or more locations visited by the user. For example, locational data may indicate that the user is at Location A, and the user, via a mobile computing device, may automatically check-in to Location A. Additional and/or alternative techniques to check-in to a geographical location may be utilized.

In some implementations any user-initiated actions identified from a mobile phone and/or other client devices 110 may not be identifiable to a specific user. For example, in situations in which the systems discussed herein collect personal information about users, or may make use of personal information, the users may be provided with an opportunity to control whether programs or features collect user information (e.g., information about a user's social network, email communications, browsing history, social actions or activities, a user's preferences, or a user's current geographic location), or to control whether and/or how to receive content from the content server that may be more relevant to the user.

For example, the identification of a how-to query may be based on identifying a user's purchase of a replacement part for a vehicle. The how-to query response system 130 may identify the task of installing the replacement part into the vehicle, and the purchase may be identified as an indication of a desire for information on how to install the replacement part into the vehicle. Based at least in part on the user's purchase, the how-to query response system 130 may identify the how-to query as "how do I install the replacement part into the vehicle". The how-to query response system 130 may optionally recommend the query to the user and/or identify a set of steps responsive to the query and provide the set of steps to the user.

As another example, the user may download complex software. The how-to query response system 130 may identify the task of installing the software, and the software download may be identified as an indication of a desire for information on how to install the software. The how-to query response system 130 may identify the how-to query as "how do I install the software". The how-to query response system 130 may optionally recommend the query to the user and/or identify a set of steps responsive to the query and provide the set of steps to the user. As another example, the user may issue a search query via client device 110. In some implementations the search system 140 may receive the search query and the how-to query response system 130 may identify the search query as a desire for information on how to perform a task related to the search query. For example, the user may issue a search query for new houses in a city. The task identified by the search query may be that of looking for a new house in the city, and the search query may be identified as an indication of a desire for information on how to find a new house in the city.

Another example may be that of a user posting a comment on a social networking platform that indicates a desire for information on how to perform a task. For example, the user may post a comment stating: "Stuck in the middle of nowhere with a flat tire". The how-to query response system 130 may identify the task of replacing the flat tire, and the post may be identified as an indication of a desire for information on how to replace the flat tire. Accordingly, the how-to query response system 130 may identify the how-to query as "how do I change a flat tire". The how-to query response system 130 may optionally recommend the query to the user and/or identify a set of steps responsive to the query and provide the set of steps to the user.

In some implementations a map-based query such as a locational query issued by the user may be identified as an indication of a desire for information on how to perform a task. For example, the user may issue a locational query for directions to a busy airport. The how-to query response system 130 may identify the task of finding parking at the airport, and the locational query may be identified as an indication of a desire for information on how to park at the airport. The how-to query response system 130 may optionally recommend a how-to query to the user that would return a set of steps on how to park and/or identify the set of steps and provide the set of steps to the user. Locational queries may be directional locational queries that may be issued by a user to one or more mapping services. For example, a user may issue a directional locational query to a geographic location on a client device 110 and one or more mapping services may be utilized to return a map with directions to the geographic location. As another example, a user may issue a directional locational query to a device equipped with GPS for turn-by-turn directions to a geographic location.

One or more of such user-initiated actions may be combined to identify a how-to query. For example, electronic communications may indicate that the user may be relocating to another city, and the user's browsing history may indicate that the user is searching for elementary schools in the new city. Based at least in part on such combined user-initiated actions, the how-to query response system 130 may identify the task of finding an elementary school, and the user-initiated actions may be identified as an indication of a desire for information on how to find an elementary school in the new city. The how-to query response system 130 may optionally recommend a how-to query to the user that would return a set of steps on finding an elementary school and/or identify the set of steps and provide the set of steps to the user.

A plurality of sources responsive to a how-to query may also be identified. In some implementations content database 120 may include identifiers (e.g., an address) of sources that are responsive to identified how-to queries. For example, the search system 140 may identify search result documents that are responsive to a how-to query and an identifier for one or more of the search result documents may then be associated with the how-to query in the content database 120. In some implementations a source may be associated with the how-to query based on a selection rate of the source and/or an amount of time that one or more users spend viewing the source after navigating to the source. For example, sources that have a relatively high selection rate and/or for which users spend a relatively high amount of time viewing may be more likely to be associated with the how-to query. The sources may include search result documents associated with the how-to query search results and/or other documents that are responsive to the how-to query.

In some implementations the sources may include a user manual that is responsive to the how-to query. The user manual may be authored by a technical writer and may include a set of instructions to assist users in performing one or more tasks. For example, a user manual for a car may include, inter alia, instructions on how to replace the car's tire with a spare tire. As another example, a user manual for a client device 110 may include instructions to assist the user with the initial configuration of client device 110 and/or assist the user in troubleshooting common problems related to client device 110. Generally, a user manual for a given object may include one or more of a title, links to other sources, a how-to guide with specific instructions to perform one or more tasks related to the object, a list of materials and/or tools needed to perform the one or more tasks, and/or a guide to troubleshoot common potential problems.

In some implementations the how-to query response system 130 may further determine a set of steps to perform a task identified by the how-to query. In some implementations the steps may be determined based on one or more sources in the plurality of identified sources. For example, the set of steps for a how-to query may be determined based one an identified user manual responsive to the how-to query. For example, the set of steps to change a car tire and replace it with a spare tire may be determined from the car's user manual. Also, for example, the how-to query response system 130 may determine the set of steps based on a non-user manual source with a comprehensive set of instructions to perform the task.

In some implementations a confidence measure may be associated with one or more of the identified sources. The confidence measure for a given source may be indicative of the effectiveness of the given source in providing correct completion steps for the task of the how-to query. In some implementations the confidence measure for the given source may be based on the timeliness of the given source. For example, a database may include timestamp data indicating the last time the given source was updated and a recently updated source may be associated with a confidence measure more indicative of confidence than a source that has not been recently updated. In some implementations the confidence measure for the given source may be based on the length of the passage of time since the last time the given source was modified. For example, a longer passage of time may be associated with a confidence measure less indicative of confidence than a shorter passage of time. In some implementations a confidence measure based on the passage of time may optionally weight the passage of time based on one or more factors such as a task type associated with the task for which the confidence measure of the source is being determined. For example, for a state-of-the art task, sources providing information related to the state-of-the art task may need to be updated more frequently than sources providing information related to other task types. Accordingly, the weighting for the passage of time in determining a confidence measure for the source for the state-of the art task may be greater than the weighting for other task types. For example, a source that provides instructions to create applications based on a computing operating system may need to be updated frequently based on the revisions to the operating system. In such an instance, a longer passage of time since the last update may be correlated to a confidence measure less indicative of confidence. On the other hand, a source providing instructions to change a car's tire may not need to be updated as frequently and a passage of time since the last update may have minimal effect on the confidence measure associated with the source. However, if the tire change task relates to a newly released model of the car, a longer passage of time since the last update and/or a lack of a recent update may be correlated to a confidence measure less indicative of confidence.

In some implementations the confidence measure for the given source may be based on the number of documents that link to the given source. In some implementations the confidence measure for the given source may be based on the percentage of documents that link to the given source in a given corpus of documents. A larger number and/or percentage of documents linking to the given source may be more indicative of popularity and/or the authoritative value of the given source and the given source may be associated with a confidence measure more indicative of confidence. In some implementations a confidence measure may only be associated with a given source if a threshold number and/or percentage of documents link to the given source.

In some implementations the confidence measure for the given source may be based on the number of outgoing links from the given source. A larger number of outgoing links may be indicative of the comprehensiveness of the given source and the given source may be associated with a confidence measure more indicative of confidence. In some implementations a confidence measure based on the number of outgoing links may optionally be based on one or more additional factors such as a selection rate of the outgoing links. For example, source A may include five outgoing links and two of these five outgoing links may be selected with at least a threshold level of frequency. This may indicate that information from at least two other sources accessed via the outgoing links may need to be combined with the information provided in source A. On the other hand, source B may include the same five outgoing links and none of these five outgoing links may be selected with at least a threshold level of frequency. This may indicate that source B is a more comprehensive source of information than source A since users of source B do not select the outgoing links for additional information with as much frequency as the users of source A. In some implementations source B may be associated with a confidence measure more indicative of confidence and source A may be associated with a confidence measure less indicative of confidence. In some implementations a selection may be identified by collating respective href attributes of outgoing links. As referred to herein, a "selection" of the search result or the resource may include, for example a mouse-click, a click-through, a voice-based selection, a selection by a user's finger on a presence-sensitive input mechanism (e.g., a touch-screen device), and/or any other appropriate selection mechanism.

As another example, the number of outgoing links from the given source may additionally be based on the number of outgoing links that were available (e.g., the number of broken links from the given source divided by the total number of links from the given source). For example, 20% of the outgoing links from source A may be available. The remaining 80% of the outgoing links from source A may be broken. This may indicate that the information provided in source A has not been updated. On the other hand, 65% of the outgoing links from source B may be available. The remaining 35% of the outgoing links from source B may be broken. This may indicate that the information provided in source B is more updated than the information provided in source A. Accordingly, source B may be associated with a confidence measure more indicative of confidence and source A may be associated with a confidence measure less indicative of confidence.

In some implementations the confidence measure for the given source may be based on an analysis of the cohesiveness of the given source. Cohesiveness may be determined based on one or more techniques. For example, elements in the given source may be classified based on their mutual similarities and dissimilarities and a distance measure may be determined between the one or more competing classifications. A small distance between the classifications may be more indicative of the source's cohesiveness, and the given source may accordingly be associated with a confidence measure more indicative of confidence. A large distance between the classifications may be indicative of the given source's lack of cohesiveness, and the given source may accordingly be associated with a confidence measure less indicative of confidence.

In some implementations the confidence measure for a given source may be based on how closely the given source relates to the task identified by the how-to query. In some implementations such a determination may be based on anchor-text evidence. For example, links between web documents may be marked with textual snippets encoded within anchor tags. The anchor tag on a first document may link to a second document. For example, the format of an HTML link that links to a source providing instructions on how to change a tire may be <a href="https://how-to//change-a-tire.com">Link Text</a>) and an anchor-text may be associated with this link. For example, the anchor-text may state "Learn more about how to change your car's tires". In such an instance, the format of the HTML link may be, for example, <a href="https://how-to//change-a-tire.com">Learn more about how to change your car's tires.</a>. The similarities between the textual snippet in an anchor-text for a given source and the task identified by the how-to query may be utilized as a measure of confidence of the given source for the how-to query. For example, the textual snippet "Learn more about how to change your car's tires" may be determined to have a high degree of similarity with the how-to query "how can one change the car's tire?". In some implementations the textual snippets from all the documents linking to the given source may be analyzed in determining a confidence measure of the given source for a how-to query. A higher degree of similarity between the textual snippet in an anchor-text for a given source and the how-to query may result in a confidence measure more indicative of confidence than a lesser degree of similarity would.

In some implementations the confidence measure for the given source may be based on the frequency of visits to the given source. Information that indicates the frequency of visits to the given source may be stored in content database 120. In some implementations the frequency of visits to the given source may be visits to the given source after submitting the one or more how-to queries for which the confidence measure of the source is being determined. A source with a higher frequency of visits may be indicative of a source that is popular among users and may be associated with a confidence measure more indicative of confidence.

In some implementations the confidence measure of the given source may be based on an analysis of the information-to-noise ratio of the given source. For example, the how-to query response system 130 may determine how much of the text in the given source was noise (e.g., HTML tags, white space, unrelated links, sponsored advertisement) as compared to useful content. Also, for example, the how-to query response system 130 may determine how much of the text in the given source is not related to the task identified by the how-to query as compared to how much of the text in the given source is related to the task identified by the how-to query.

In some implementations one or more existing rankings and/or one or more user reviews associated with a given source may be utilized in determining the confidence measure of the given source.

In some implementations the confidence measure of the given source may be based on the number of steps provided for completing the task of the how-to query. In some implementations a larger number of steps may be more indicative of the comprehensiveness of the set of instructions. Accordingly, a given source providing larger number of steps to perform a task may be associated with a confidence measure more indicative of confidence.

In some implementations the confidence measure of the given source may be based on the author and/or publisher associated with the given source. For example, in some implementations the how-to query response system 130 may identify an author and/or publisher related to the given source (e.g., if the how-to query relates to a technical task, is the author and/or publisher a recognized authority for such a technical task). In some implementations the how-to query response system 130 may identify the author of the given source and one or more attributes of the author to determine the confidence measure of the given source (e.g., if the how-to query relates to a technical task, does the author have the appropriate technical qualifications and/or experience to provide authoritative information related to the how-to query).

One or more techniques discussed herein to determine the confidence measure of a given source may be optionally combined. For example, a linear combination of the one or more confidence measures discussed herein may be utilized to associate a confidence measure with the given source. In some implementations a weighted average of the one or more confidence measures discussed herein may be utilized to associate a confidence measure with the given source. Weighting may be based on, for example, one or more of the task identified by the how-to query, the source, and the corpus of documents.

Additional and/or alternative techniques may be utilized to determine the confidence measure of a given source. In some implementations the how-to query response system 130 may include the scoring system 135 that determines the confidence measure for a given source. In some implementations a given source may be associated with a confidence measure and this information may be stored in a database such as content database 120. In some implementations the confidence measure may be utilized to determine a ranking of the identified sources related to a how-to query.

In some implementations the how-to query response system 130 may utilize the one or more identified sources to determine a set of steps to perform the task identified by the how-to query. For example, the how-to query response system 130 may identify a manual and extract from the manual the one or more steps pertinent to performing the task. In some implementations the how-to query response system 130 may utilize the confidence measures associated with each of one or more sources to rank the one or more sources and select the source with the highest confidence measure as a source for the set of steps to perform the task. In some implementations the how-to query response system 130 may utilize the confidence measures to rank the one or more sources, identify one or more higher ranked sources, and extract one or more steps from the higher ranked sources. For example, the how-to query response system 130 may identify and rank sources A, B, C, and D in that order based on their confidence measures. The how-to query response system 130 may identify sources A and B as the most relevant sources based on the ranking. Source A may include steps {A1, A2, . . . , A5} and source B may include steps {B1, B2, . . . , B6}. The how-to query response system 130 may select steps A1 through A5 from source A, followed by step B6 from source B. Accordingly, the determined set of steps may be {A1, A2, A3, A4, A5, B6}. B6 may optionally be identified as an optional step. In some implementations the how-to query response system 130 may not select steps from sources C and D based on confidence measures associated with those sources that are less indicative of confidence. In some implementations, sources C and D may be identified as unreliable sources based on confidence measures that fail to satisfy a threshold value.

In some implementations a given source may not provide the information needed to perform a task in the form of a set of steps. Instead the information may be provided in the form of one or more paragraphs and/or other text segments. In such instances, the how-to query response system 130 may determine the steps based on the content of the paragraphs and/or other text segments. For example, in some implementations a given sentence in a paragraph may be parsed into more than one step. Also, for example, two or more sentences in a paragraph may be merged together to form a step.

For example, consider the paragraph: "For large tar stains, it may be best to first apply a bag of ice cubes to the stained portion of the clothing. Freezing the tar allows you to remove the large stains. Next, when the tar is hardened, it may be scraped off with a knife or peeled off in sections." In some implementations the how-to query response system 130 may break the paragraph down into the three constituent sentences and determine a set of steps based on the sentences. For example, the how-to query response system 130 may determine that the first sentence "For large tar stains, it may be best to first apply a bag of ice cubes to the stained portion of the clothing" provides the step: "Apply a bag of ice cubes to the stained portion of the clothing". The how-to query response system 130 may determine that the second sentence is not an action statement based on an analysis of the words, their respective parts of speech, and/or their syntactic structure. It may be additionally determined that the third sentence "Next, when the tar is hardened, it may be scraped off with a knife or peeled off in sections" provides the step: "Scrape off the hardened tar". Accordingly, the how-to query response system 130 may segment the given paragraph and extract the following set of two steps from the paragraph: {"Apply a bag of ice cubes to the stained portion of the clothing", "Scrape off the hardened tar"}.

One or more natural language processing techniques may be optionally utilized to segment a paragraph or other text segment into steps that perform at least a portion of the task. For example, key terms and/or key phrases may be identified along with their parts of speech. A parse tree may be determined that links key terms and/or phrases in one or more sentences based on their syntactic and/or semantic relationships. In some implementations a context-free grammar may be utilized to structure a sentence from the parse tree. Transitional terms such as "first", "next", "followed by", "after", "at the outset", "finally", etc. may be optionally utilized to segment a paragraph and/or a sentence.

For example, consider the paragraph discussed earlier: "For large tar stains, it may be best to first apply a bag of ice cubes to the stained portion of the clothing. Freezing the tar allows you to remove the large stains. Next, when the tar is hardened, it may be scraped off with a knife or peeled off in sections." The key terms and/or key phrases may be identified, for example, as "large tar stains", "first", "apply", "ice cubes", "stained portion", "freezing", "remove", "large stains", "next", "tar is hardened", "scraped off", and "peeled off".

A parse tree may be determined with the identified key terms and/or key phrases as the nodes of the parse tree. Based on semantic relationships, "large tar stains", "stained portion", "large stains" may be linked together in the parse tree. Likewise, "remove", "scraped off", and "peeled off" may be linked together in the parse tree based on their semantic relationships. Again, for example, "first" and "next" may be linked together as transitional terms in the parse tree. As another example, "ice cubes", "freezing", and "tar is hardened" may be linked together in the parse tree based on their respective causal relationships. Additionally and/or alternatively, the terms "remove", "scraped off", and "peeled off" may be identified as terms describing an action whereas the terms "large tar stains", "stained portion", "large stains" may be identified as nouns with an adjective. Accordingly, the how-to query response system 130 may link each of the terms "remove", "scraped off", and "peeled off" to each of the terms "large tar stains", "stained portion", "large stains" in the parse tree. In some implementations the how-to query response system 130 may include a processor for a context-free grammar and/or an attribute grammar that may structure sentences based on the parse tree. Based at least in part on the syntactic relationships between the nodes in the parse tree, the how-to query response system 130 may determine the set of steps to be {"first apply ice cubes to freeze and harden a large tar stain", "next scrape off the hardened tar stain"}.

In some implementations the how-to query response system 130 may arrange the steps in the identified set of steps in a particular order. In some implementations the order of the steps in the set of steps may be based on an existing arrangement of steps in one or more sources. In some implementations the arrangement may be determined based on the order of appearance of the steps in text segments, and/or the order of appearance of the text segments in a document. Additionally and/or alternatively the arrangement of the steps in the set of steps may be determined based on transition terms such as "first", "next", "followed by" and "lastly". In the example above, "first" may be associated with the step "Apply ice cubes to freeze and harden a large tar stain" and "next" may be associated with the step "Scrape off the hardened tar stain". Based at least in part on such an analysis, the how-to query response system 130 may arrange the steps in the set of steps as the step "Apply ice cubes to freeze and harden a large tar stain" followed by the step "Scrape off the hardened tar stain".

Referring to FIG. 3, an example illustrates the identification of one or more steps to perform a task from a plurality of sources. In some implementations the how-to query response system 130 may identify one or more steps to perform a task from a plurality of sources and identify one or more groups of steps from the plurality of sources. For example, source A may include three steps {A1, A2, A3}, source B may include four steps {B1, B2, B3, B4} and source C may include three steps {C1, C2, C3}. The how-to query response system 130 may identify one or more groups of steps from these sources. For example, a first group of steps may be identified as {A1, B1, B2, C1}, a second group of steps may be identified as {A2, B3, C2}, and a third group of steps may be identified as {A3, B4, C3}. In some implementations each identified group of steps may be representative of a common action needed to perform the task. For example, the first group of steps {A1, B1, B2, C1} may be representative of the action "apply ice cubes". In some implementations the how-to query response system 130 may select one or more representative steps from each group of steps to determine the set of steps. For example, the how-to query response system 130 may select B2 from the first group of steps, A2 and B3 from the second group of sets and C3 from the third group of sets to determine the set of steps as: {B2, A2, B3, C3}. Details on how such determinations may be made are provided herein.

The one or more steps to perform the task may be grouped into one or more groups based on one or more factors. In some implementations the scoring system 135 may determine similarity measures between two or more identified steps in determining if they are representative of a common action. For example, a pair of steps (in a single source and/or one from each of two sources) may be grouped together if the similarity measure for the pair is indicative of a high degree of similarity; whereas a pair of steps may be grouped separately if the similarity measure for the pair is indicative of a low degree of similarity.

In some implementations the similarity measure for a given pair of identified steps may be based on one or more matching techniques to match the given pair of steps. For example, a database such as content database 120 may include distributionally similar key terms and/or phrases and their corresponding distributional similarity scores. Key terms and/or phrases that typically occur in similar contexts may, for example, be considered to have similar meanings. For example, a first term from a first step from a first source that co-occurs with the same key terms as that of a second term from a first step from a second source over a collection of documents (e.g., HTML documents and/or PDF documents) may be considered to be distributionally similar to the second term. The distributional similarity of the given pair of steps may be determined based on the distributional similarity scores of their respective key terms and/or phrases. For example, a larger number of distributionally similar terms in the given pair of steps may be indicative of a greater similarity between the steps in the given pair. Accordingly, a similarity measure more indicative of similarity may be associated with the given pair of steps. As another example, a larger distributional similarity score between the terms in the given pair of steps may be indicative of a greater similarity between the steps in the given pair. Accordingly, a similarity measure more indicative of similarity may be associated with the given pair of steps. Additional and/or alternative matching techniques may be utilized. For example, the similarity between the key terms and/or phrases may be calculated by computing the semantic distance, or length of path along edges between the key terms and/or phrases in a lexical database. In some implementations matching techniques may utilize exact matching and/or soft matching of the key terms and/or phrases.

In some implementations the similarity measure for a given pair of steps may be based on an edit distance between the given pair of steps. The edit distance may be indicative of the difference between the respective key terms and/or key phrases in the pair of steps. In some implementations the edit distance may count the number of characters in which two key terms may differ from each other. For example, the edit distance between "stain" and "stains" may be determined to be one, whereas the edit distance between "stain" and "stained" may be determined to be two. In some implementations the edit distance between a word and its augmentations may be set to be zero. For example, "stain", "stains", "stained", "staining", etc. may be determined to share "stain" as a common root and any pair of words formed from these four words may be determined to have an edit distance of zero. In some implementations one or more terms of the given pair of steps may be canonicalized prior to determining an edit distance between the given pair of steps.

In some implementations the similarity measure for a given pair of steps may be based on the contextual usage of the respective key terms and/or key phrases in the pair of steps, including, for example, measures based on identifying a semantic similarity score, a context-based matching score, and/or statistical term frequencies.

Additional and/or alternative techniques may be used to determine the similarity measure between the given pair of steps. For example, each identified step may be associated with a parse tree (e.g., as described herein) and a similarity measure for a pair of steps may be based on a determination of similarity of their respective parse trees. For example, the respective nodes of a pair of parse trees may be compared based on semantic and/or contextual similarities. In some implementations two parse trees with similar nodes and/or similar underlying semantic structures may be determined to be structurally similar. Accordingly, the pair of steps corresponding to the pair of parse trees may be associated with a similarity measure indicative of a higher degree of similarity. In some implementations the scoring system 135 may assign scores to the nodes and/or links in a given parse tree and determine a similarity score for the given parse tree based on linear combinations and/or weighted averages of the scores for the nodes and/or links. The similarity measure for the pair of parse trees may be based on a comparison of the respective similarity scores. In some implementations two parse trees with similarity scores within a certain threshold may be assigned a similarity measure of one. Accordingly, the associated steps may also be assigned a similarity measure of one. Likewise, two parse trees with similarity scores outside a certain threshold may be assigned a similarity measure of zero and the associated steps may also be assigned a similarity measure of zero. A pair of steps with a similarity measure of one may be grouped together, whereas a pair of steps with a similarity measure of zero may be grouped separately.

In some implementations the how-to query response system 130 may select one or more steps from each group of steps to determine the set of steps to perform the task. The one or more steps may be selected based on a variety of factors. In some implementations the steps in each group may be ranked and the how-to query response system 130 may select one or more steps from each group of steps based on the ranking. For example, source A may include three steps {A1, A2, A3}, source B may include four steps {B1, B2, B3, B4} and source C may include three steps {C1, C2, C3}. The how-to query response system 130 may identify one or more groups of steps from these sources. For example, three groups of steps may be identified and the steps within each group may be ranked as {A1, B1, B2, C1}, {B3, A2, C2}, and {C3, A3, B4}. The how-to query response system 130 may select the highest ranked step in each group to determine the set of steps. For example, the set of steps may be determined as: {A1, B3, C3}.

In some implementations the how-to query response system 130 may select more than one step from one or more of the groups to determine the set of steps. For example, for the task related to removing tar from clothing, the first group of steps may include a step A1 that may correspond to "freeze tar and scrape it off", a step C1 that may correspond to "harden tar with ice and scrape it away", a step B1 that may correspond to "harden tar with ice" and a step B2 that may correspond to "scrape off the hardened tar". In such an instance, the how-to query response system 130 may determine that the first group of steps includes two distinct steps represented by B1 and B2, and may include these two steps from the first group of steps and include one step each from the second and third groups of steps in the determined set of steps. For example, the set of steps may be determined as: {B1, B2, A2, C3}.

In some implementations the how-to query response system 130 may not select any steps from one or more groups to determine the set of steps. For example, the second group of steps in the previous example may be representative of "The clothing material may be made of fabric, leather, and blended wool." In such an instance, the how-to query response system 130 may determine that the second group of sets does not represent a task and may not include any members of that group in the determined set of steps. For example, the set of steps may be determined as {B1, B2, C3}, where no step is selected from the second group of steps.

In some implementations a group may be formed by aggregating similar information from the plurality of sources. The aggregated information may include steps, paragraphs, and/or other text segments. One or more steps may be determined from such aggregated information based on semantic and/or syntactic analysis of the aggregated information utilizing techniques described herein. For example, one or more natural language processing techniques may be utilized to segment the aggregated information into steps that perform at least a portion of the task. As another example, a parse tree may be determined for the aggregated information and one or more steps may be identified. In some implementations the how-to query response system 130 may include a context-free grammar processor and/or an attribute grammar processor that may structure sentences based on the parse tree.

In some implementations the ordering of the set of steps to perform the task may be determined based on the ordering of corresponding steps in one or more sources. For example, the steps in a first group of steps may precede the steps in a second group of steps in one or more sources from which the steps are derived and be ordered accordingly. For example, step A1 may be selected to include in the set of steps from the group of steps {A1, B1, C1}. Step A1 may be identified as the first step in the set of steps based on A1 being the first step in source A and/or steps B1 and/or C1 being the first steps in respective of sources B and C. In some implementations one or more groups of steps may be optionally ranked and the how-to query response system 130 may order the set of steps additionally and/or alternatively based on such ranking. For example, the set of steps may be ordered based on respective relevance scores for groups of steps from which the set of steps is derived, as discussed herein.

In some implementations the scoring system 135 may determine a relevance score for each of one or more steps within each group of steps and may rank the steps in the group of steps based on the relevance scores. The ranking of the steps may be utilized in selecting a step from the group of steps, formulating a step based on the group of steps, and/or determining an order of the selected step based on the group in the determined set of steps. In some implementations the relevance score for a step may be indicative of confidence that the step is an appropriate step for completing the task identified by the how-to query. The relevance score for a step may be determined based on one or more methods utilized to determine the confidence measures of a source of the step as described herein. For example, key terms and/or key phrases appearing in a step may be matched to key terms and/or key phrases that may be associated with the task identified by the how-to query. A step that more closely matches the task identified by the how-to query may be associated with a relevance score more indicative of relevance to the task. For example, a step from a first source may be "scrape the hardened tar off the shirt" and it may be in an identified group with a step from a second source that may be "scrape the hardened tar off the fabric". The step of "scrape the hardened tar off the shirt" may have a higher relevance score to the how-to query of "how to remove tar from a shirt" than would the step of "scrape the hardened tar off the fabric". Matching may be based on soft matching, exact matching, determining semantic distance, and/or determining distributional similarities between the respective key terms and/or key phrases.

Additionally and/or alternatively, the relevance score for a given step may be based on the confidence measure for the one or more sources in which the step may be identified. For example, a step that is extracted from a source with a confidence measure indicative of high confidence may be associated with a relevance score more indicative of relevance than a step that is extracted from a source with a confidence measure not indicative of high confidence. For example, one or more steps that may be extracted from a highly regarded technical manual may be associated with a relevance score more indicative of relevance. Additional and/or alternative methods of determining the relevance score may be utilized.

In some implementations relevance scores may additionally and/or alternatively be determined for a group of steps. In some implementations the relevance score for a given group of steps may be based on the relevance score of each step within the groups of steps. For example, the relevance score for a group of steps {A1, B1, C1} may be based on an average of the relevance score for step A1, the relevance score for step B1, and the relevance score for step C1. In some implementations the relevance score for a group of steps may be based on how many sources identify a step corresponding to the group of steps as required to perform the task. In some implementations, the groups of steps may be ranked based on their respective relevance scores. For example, the groups of steps may be ranked in order of relevance from the most relevant to the least relevant based at least in part on their relevance scores.

As discussed herein, in some implementations the determined set of steps may not include a step based on one or more of the groups of steps. For example, one or more sources may indicate that steps corresponding to groups A, B, C, and D may be required to perform the task, whereas one or more other sources may indicate that steps corresponding to groups B, C, D, and E may be required to perform the task. In some implementations the determined set of steps may include steps based on groups A-D, but omit a step based on group E. In some implementations the determined set of steps may indicate steps A-D are necessary and may identify step E as an optional step.

In some implementations whether a step in the determined set of steps includes a step based on a group of steps may be based on how many sources identify a step corresponding to the group of steps as required to perform the task. In some implementations the sources may correspond to the sources represented in all groups of steps related to a given task. In some implementations the sources may include additional and/or alternative sources. In some implementations at least a threshold of sources must identify a step corresponding to the group of steps as required to perform the task. For example, it may be determined that the threshold is 75%, that is if at least 75% of the plurality of sources identify a given step corresponding to the group of steps, then a step based on the group of steps will be included in the set of steps. In some implementations if less than the threshold of the plurality of sources identify a given step corresponding to the group of steps, but more than a second threshold identify the given step, then the given step may be determined to be an optional step in performing the task. For example, if the first threshold is 75% and the second threshold is 50%, it may be determined that 81% of the plurality of sources identify a step corresponding to a group of steps B as required to perform the task. Likewise, a step corresponding to a group of steps C may be identified by 85% of the sources, a step corresponding to a group of steps D by 77% of the sources, and a step corresponding to a group of steps A by 69% of the sources, and a step corresponding to a group of steps E by 15% of the sources. Having met the threshold of 75%, a step based on group of steps B (81%), a step based on group of steps C (85%), and a step based on group of steps D (with 77%) may be identified as steps that are required to perform the task. Having not satisfied the threshold of 75%, but having satisfied the second threshold of 50%, a step based on group of steps A (69%) may be identified as an optional step. A step based on group of steps E (15%) may be identified as a step that is not required to perform the task since it fails to satisfy either threshold and may be omitted from the determined set of steps. Accordingly, the determined set of steps may be B, C, D, and optionally A.

In some implementations the relevance score for a step and/or group of steps may be based on a confidence rating such as "high confidence", "medium confidence", and "low confidence". For example, if an overwhelming majority of sources indicate that a given step corresponding to a group of steps is required to perform the task, then the given step may be associated with a confidence rating of "high confidence" indicating a high level of confidence that the given step is required to perform the task. On the other hand, if only 70% of the sources indicate the given step is required, then the given step may be associated with a confidence rating of "medium confidence". As another example, if only 50% of the sources indicate the given step is required, then the given step may be associated with a confidence rating of "low confidence".

In some implementations the relevance score for a group of steps may be based on the confidence measures of the one or more sources from which the step may be identified. For example, a linear combination and/or weighted average of the confidence measures of all sources contributing to the group of steps may be utilized.

In some implementations relevance scores may additionally and/or alternatively be determined for the determined set of steps. In some implementations the relevance score for the determined set of steps may be based on the relevance scores for the groups of steps on which one or more of the determined set of steps are based and/or the relevance scores for any individual steps on which one or more of the determined set of steps are based. For example, a linear combination and/or a weighted average of the relevance scores for the individual steps included in the determined set of steps may be utilized to determine the relevance score for the determined set of steps. For example, if a set of steps is determined as {A1, B2} the relevance score for the set of steps may be based on the relevance score for step A1 and the relevance score for step B2. Also, for example, a linear combination and/or a weighted average of the relevance scores for the groups of steps on which the determined set of steps are based may be utilized to determine the relevance score for the determined set of steps. For example, if a set of steps is determined as {A1, B2} from two groups of steps {A1, B1} and {A2, B2}, the relevance score for the set of steps may be based on the relevance score for group of steps {A1, B1} and the relevance score for groups of steps {A2, B2}

In some implementations the relevance score for the determined set of steps may be based on the confidence measures for the sources that contribute to the steps included in the determined set of steps. For example, for a how-to query related to changing a car tire, a relevance score indicative of high confidence may be determined for a set of steps that are based on a technical manual published by the car manufacturer and/or a tire manufacturer. For example, if the set of steps is extracted from the technical manual and/or confirmed by the technical manual a relevance score indicative of high confidence may be determined. Also, for example, for a how-to query related to changing a car tire, a relevance score indicative of medium or low confidence may be determined for a set of steps that are based only on one or more low quality sources.

In some implementations the relevance score for the determined set of steps may be based on a number of sources that agree on the set of steps for performing the task. For example, the scoring system 135 may determine a relevance score less indicative of confidence for a set of steps if multiple sources indicate that one or more of the determined set of steps are optional. Also, for example, the scoring system 135 may determine a relevance score less indicative of confidence for a set of steps if certain steps were omitted from the determined set of steps because less than a threshold level of sources failed to indicate those steps as necessary, but multiple sources still indicated that one or more of the determined set of steps were desired. Also, for example, the scoring system 135 may determine a relevance score less indicative of confidence for a set of steps if the collection of identified sources identify multiple ways to perform the task. In some implementations the scoring system 135 may determine a relevance score less indicative of confidence if there are multiple ways to perform the task. Additional and/or alternative techniques may be utilized to determine relevance scores. In some implementations any determined relevance scores may be stored in a database such as content database 120.

In some implementations a threshold for the relevance score may be determined and only sets of steps that are associated with a relevance score satisfying that threshold for the relevance score may be provided in response to a how-to query. In some implementation if the relevance score associated with a set of steps does not satisfy the threshold for the relevance score, then the how-to query response system 130 may not provide the determined set of steps in response to a how-to query. In some implementation if the relevance score associated with a set of steps does not satisfy the threshold for the relevance score, then the how-to query response system 130 may determine a new set of steps to be associated with the how-to query. In some implementations a set of steps associated with a relevance score lower than the threshold value for the relevance score may not be stored in the content database 120.

In some implementations the how-to query response system 130 may identify one or more attributes for the set of steps and associate such attributes with the set of steps. Attributes may include, for example, one or more of a title for the set of steps (e.g., "How to change a car tire"), a skill level (e.g., a person of driving age), an estimated time required (e.g., twenty-five minutes), tools required (e.g., a jack and a wrench), materials required to perform the task, one or more sources (e.g., user manual) associated with the determined set of steps, and/or one or more cautionary statements (e.g., park car on a level surface, place stoppers behind tires to prevent rolling, apply hand brake). The sources may include sources on which the set of steps is based and/or which are identified as conforming to one or more of the steps.

For example, the title associated with a task may be identified in one or more ways such as identifying the title from a manual, from the how-to query, from anchor-text, and/or from search result documents responsive to the how-to query. In some implementations the title may be identified based on a term frequency of words and/or phrases that appear in the plurality of sources responsive to the how-to query. In some implementations the term frequency determination may be based on term frequency-inverse document frequency ("TFIDF") weighting of a word and/or phrase. For example, words like "tar" and "remove" may be relatively rare in a corpus of documents and the frequency of the terms "tar" and "remove" appearing in a given document may be higher than their respective frequencies in a corpus of documents. Accordingly, a greater weight may be associated with the terms "tar" and "remove" based on TFIDF. A term with low frequency in a corpus of documents but a very high frequency in a given subset of documents, such as sources from which a set of steps may be determined, may be associated with a TFIDF weight indicating its relative importance in the given subset of the corpus of documents. Accordingly, "tar" and "remove" may be identified as terms that are highly relevant in the given subset of the corpus of documents. In some implementations the title may be based on the how-to query itself. For example, if the how-to query states "how do I remove tar from clothing", the how-to query response system 130 may identify the title as "Removing tar from clothing". In some implementations one or more inquiry terms of a how-tow query (e.g., "how to") may be combined with one or more task term (e.g., "tar" and "remove") to determine a title (e.g., "How to remove tar"). In some implementations the title may be based on an anchor text of one or more sources from which the set of steps is determined. For example, the anchor-text associated with a primary source from which the set of steps is determined may state "Learn more about how to change your car's tires", and the how-to query response system 130 may identify the title as "Changing car tires".

In some implementations the one or more attributes for the set of steps may be identified in a manner similar to determining the set of steps as discussed herein. Additionally and/or alternatively, image processing techniques may be utilized to analyze one or more of the plurality of sources to identify objects, entities, text embedded in images, etc. to identify one or more attributes. For example, with reference to the task of changing a car's tire, one or more sources may include images of a wrench and a jack, and these may be identified as tools required to perform the task. As another example, one or more sources may identify a wrench and a jack as tools required to perform the task. In some implementations information related to attributes may be extracted from the one or more sources based on identification of terms and/or phrases based on TFIDF and/or other techniques.

In some implementations relevance scores may be associated with one or more identified attributes. For example, if 90% of the sources mention a jack and a wrench in a listing of tools, then a relevance score indicative of high relevance, and/or a confidence rating of "high confidence" may be associated with a jack and wrench. On the other hand, if 50% of the sources indicate a flashlight in a listing of tools, then a relevance score not indicative of high relevance, and/or a confidence rating of "medium confidence" may be associated with a flashlight. In some implementations a flashlight may be included as an optional tool based on its lower relevance score. In some implementations the jack, the wrench, and the flashlight may be optionally be individually associated with relevance scores ranked relative to one another. In some implementations a relevance score for a set of tools may be determined. The relevance score for the set of tools may be based on the individual relevance scores for the jack, the wrench, and the flashlight. Thresholding may optionally be utilized in determining one or more attributes (e.g., to filter out outlier data).

In some implementations the identified how-to query, the corresponding determined set of steps, and their association may be stored in content database 120. Additionally and/or alternatively, one or more attributes associated with the set of steps may be stored in content database 120 and associated with the set of steps and/or the how-to query. As discussed herein, in some implementations additional how-to queries may be associated with the set of steps and/or the attributes based on determined similarity between the additional how-to queries and the identified how-to query. In some implementations the set of steps may be provided in response to a how-to query. For example, users may issue a how-to query to the search system 140 via one or more client devices 110. The search system 140 may receive how-to queries from one or more client devices 110 and may execute the how-to queries against a content database 120 of stored steps and/or associated attributes. The search system 140 may identify the determined set of steps associated with the issued how-to query, and may respond by generating search results that are provided to the one or more client devices 110 in a form that can be presented to the users. In some implementations how-to queries may be formulated by a user via textual input. In some implementations how-to queries may additionally and/or alternatively be formulated based on spoken commands and/or image and/or video analysis. For example, a client device 110 of a user may receive speech input from a user and submit a query to search system 140 based on such speech input. Also, for example, a client device 110 of a user may capture image and/or video and submit a query to search system 140 based on such image and/or video. For example, a client device 110 of a user may be utilized to capture an image of a flat tire and the image of the tire may be provided to search system 140. Based on such an image, the search system may determine the user is looking for steps related to changing a flat tire.

In some implementations the scoring system 135 may determine a quality measure for a determined set of steps. The quality measure is indicative of quality of the determined set of steps provided in response to a how-to query based on user feedback. The quality measure may be used to refine the relevance score of the determined set of steps. For example, the determined quality measure of a given set of steps responsive to a given how-to query may be indicative of negative feedback and utilized to demote the relevance score associated with the given set of steps for the given how-to query. In some implementations the quality measure may demote a relevance score to a degree wherein the relevance score does not satisfy a threshold required to continue to provide the given set of steps in response to the given how-to query.

In some implementations the quality measure may be based on a number of users viewing the determined set of steps provided in response to the how-to query, a number of sites linking to the determined set of steps, user reviews, and/or user ratings. One or more techniques may optionally be combined to determine the quality measure. In some implementations a threshold value may be determined and the quality measure of a determined set of steps provided in response to a how-to query may be compared to the threshold value. A set of steps associated with a how-to query may be associated with a quality measure indicative of high quality if the quality measure satisfies the threshold. In some implementations the difference between the quality measure and the threshold value may be indicative of the quality of the set of steps. For example, a larger positive difference may be more indicative of confidence and/or associated with a rating of "high confidence", a smaller positive difference may be less indicative of confidence and/or associated with a rating of "medium confidence", whereas if the quality measure does not satisfy the threshold, it may be associated with a quality measure indicative of low confidence and/or associated with a rating of "low confidence". If the quality measure does not satisfy the threshold for the quality measure, in some implementations the how-to query response system 130 may determine a new set of steps and/or identify additional steps and/or attributes to be better responsive to the how-to query.

Similar techniques may be utilized to determine a quality measure of each individual step in the determined set of steps provided in response to a how-to query. Likewise, a quality measure may be determined for the one or more attributes associated with the determined set of steps provided in response to the how-to query.

Figure 4:
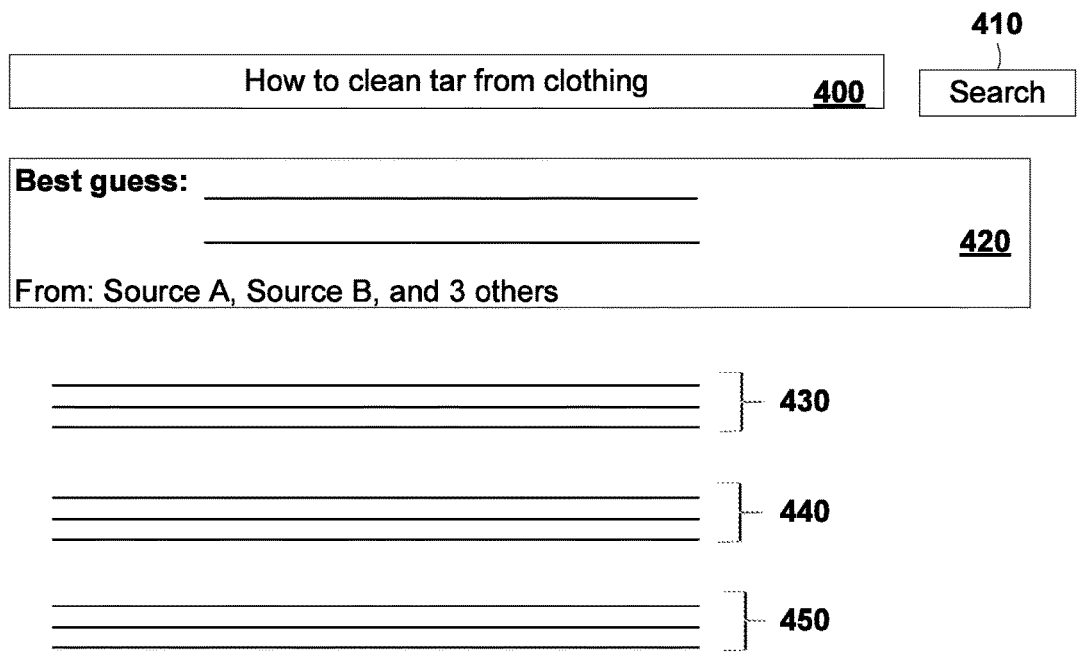
FIG. 4 is an example graphical user interface for providing a set of steps to perform the task.

Referring to FIG. 4, an example graphical user interface for providing a set of steps to perform a task is shown. The user may input a how-to query "How to clean tar from clothing" into a user-editable field such as search box 400 and issue a search by selecting a search icon 410. The search system 140 receives the how-to query and identifies a determined set of steps associated with the submitted how-to query. In some implementations the determined set of steps may be displayed in a highlighted form, for example, in display box 420. In some implementations the set of steps may be displayed with a heading such as "Best Guess" indicating a medium level of confidence in the determined set of steps. In some implementations the set of steps may be displayed with a heading such as "Authoritative Steps" indicating a high level of confidence in the determined set of steps. Additional and/or alternative indicators of confidence may accompany the set of steps. Indicators of confidence for the set of steps may be based on a relevance score associated with the set of steps as described herein.

In some implementations indicators of confidence may additionally and/or alternatively be associated with individual steps in the set of steps. Indicators of confidence for the set of steps may be based on relevance scores associated with the individual steps as described herein. For example, each step in the set of steps may be provided with an indicator of confidence in that step. For example, steps A, B, and C may be provided with a "high confidence" rating whereas step D may be provided with a "medium confidence" rating. In some implementations one or more optional steps may be provided. In some implementations one or more optional steps may be provided with confidence measures based on relevance scores associated with the optional steps. For example, an optional step may be annotated with the statement "60% of sources suggest step E as a step". In some implementations optional steps and/or alternate steps may be annotated with confidence measures that are indicative of user feedback directed particularly at such steps. For example, steps E and F may be provided as optional steps and/or alternate steps and may be annotated with the statement "60% of users recommended step E whereas 20% of users recommended step F". In some implementations display box 420 may also include one or more attributes such as a listing of the sources of the information, "From: Source A, Source B, and 3 others." Hyperlinks to such sources may optionally be provided. In some implementations the one or more attributes may be provided with an indicator of confidence as described herein (e.g., the sources may each be provided with an indicator indicative of the respective confidence measure). Additional search results may follow such as first search result 430, second search result 440, and third search result 450.

Figure 5:
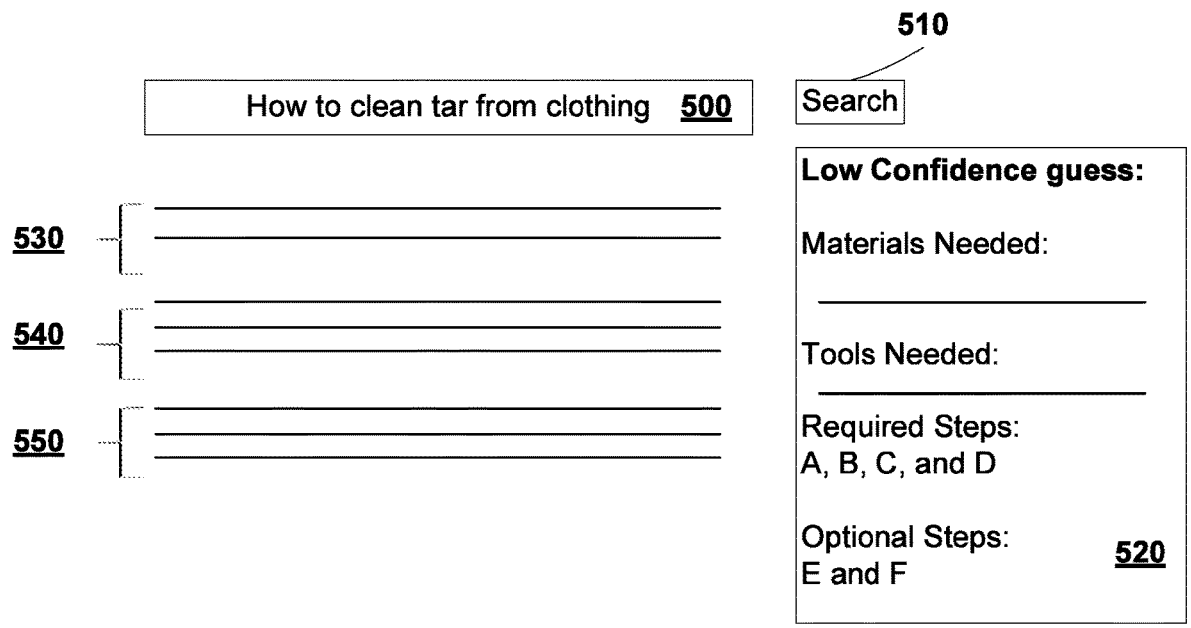
FIG. 5 is another example graphical user interface for providing a set of steps to perform the task.

Referring to FIG. 5, another example graphical user interface for providing a set of steps to perform the task is shown. The user may input a how-to query "How to clean tar from clothing" into a user-editable field such as search box 500 and issue a search by selecting a search icon 510. The search system 140 receives the how-to query and identifies a determined set of steps associated with the submitted how-to query. In some implementations the determined set of steps may be displayed in a highlighted form, for example, in display box 520. In some implementations if the determined set of steps is associated with a quality measure and/or relevance score indicating "low confidence", the how-to query response system 130 may respond to the user's query with an indication that the set of steps is associated with a rating of "low confidence." In some implementations the set of steps may be displayed with a heading such as "Low confidence guess" as illustrated in FIG. 5. In some implementations the user may be prompted prior to providing display box 520 to determine if the user is interested in a set of steps associated with a relevance score that is indicative of lower quality. The how-to query response system 130 may determine whether to provide the identified set of steps based on whether the user indicates an interest in the lower quality set of steps. In some implementations the how-to query response system 130 may store user responses to one or more such prompts and determine the quality measure of the determined set of steps based on user responses. For example, if more than a threshold number of users indicate a desire to receive the set of steps associated with a relevance score indicating "low confidence", the how-to query response system 130 may determine a quality measure indicative of quality and increase the relevance score for that set of steps based on the quality measure. In some implementations the how-to query response system 130 may respond to a how-to query by stating that "The determined set of steps is associated with a rating of 'low confidence'; however, 75% of users are willing to receive the set of steps", and then prompt the user for an indication as to their desire to receive the indicated set of steps. In some implementations the steps may be provided in the form of required steps A through D, and optional steps E and F.

In some implementations display box 520 may also include one or more attributes such as materials needed to perform the task and tools needed to perform the task. In some implementations one or more of steps and/or attributes may be hyperlinked to different parts of the same document (e.g., a source utilized in determining the steps) and/or to parts of different documents (e.g., sources utilized in determining the steps). Search results may be additionally and/or alternatively provided such as first search result 530, second search result 540, and third search result 550.

In some implementations a query score may be associated with a query and/or a sequence of queries submitted by a user. The query score is indicative of confidence that a submitted query and/or sequence of queries indicate a desire to receive a set of steps for completing a task indicated by the query. For example, a query that includes an inquiry term and a task term has a high likelihood of being a query for which it is desirable to provide a set of steps for completing a task related to the task term. Accordingly, a query score more indicative of confidence that the submitted query is a query for which it is desirable to provide a set of steps for completing a task related to the task term of the query may be associated with such a query. As another example, a query that includes an inquiry term and does not include a task term that identifies a specific task has a high likelihood of being a how-to query, but cannot be tied to a specific task. For example, the task term may be ambiguous and related to multiple tasks. Accordingly, a query score less indicative of confidence that the submitted query is a query for which it is desirable to provide a set of steps for completing a task related to the task term may be associated with such a query. As another example, for a query that includes an inquiry term and does not include any task term, a query score may be determined that indicates it is not desirable to provide a set of steps for completing a task. As another example, for a query that includes a task term but does not include an inquiry term a query score may be determined that indicates it is not desirable to provide a set of step for completing a task. However, if the query was preceded by one or more queries that included the same task term, or related task terms, then a query score may be determined that indicates it is desirable to provide a set of step for completing a task. Preceding queries that include the same task term or related task terms may indicate the user is likely searching for steps related to completing the task.

In some implementations the query score may be based on the one or more user-initiated actions. For example, the user may download software X with a self-installation feature. Such user-initiated action may have a low likelihood of being an indication of a desire to receive a set of steps for installing the software X. Accordingly, a query score less indicative of confidence may be associated with the query "how to install software X". On the other hand, the user may download complex software Y that may need to be installed manually. Such user-initiated action may have a high likelihood of being an indication of a desire to receive a set of steps for installing the software Y. Accordingly, a query score more indicative of confidence may be associated with the query "how do I install software Y".

In some implementations a query score more indicative of confidence may be associated with a query when the query is based on more than one user-initiated action. For example, electronic communications may indicate that the user may be relocating to a new city. The user's browsing history may indicate that the user is searching for a new school in the city. Based at least in part on such user-initiated actions, the how-to query response system 130 may identify a how-to query as "how do I find a new school in the city", and the scoring system 135 may associate a query score more indicative of confidence with such a how-to query. User's browsing history may additionally indicate that the user is searching for a new home in the city. Based at least in part on such additional user-initiated action, the how-to query response system 130 may identify a how-to query as "how do I find a new home in the city", and the scoring system 135 may associate a query score more indicative of confidence with such a how-to query. In some implementations scoring system 135 may increase the individual query scores for the how-to query "how do I find a new school in the city" and the how-to query "how do I find a new home in the city", based on the additional browsing history related to searching for new homes in the city.

In some implementations a determined set of steps may be provided in response to a query based on its query score. For example, a determined set of steps may be provided in response to a query if that query is associated with a query score that satisfies a threshold query score. The threshold query score may be indicative of sufficient confidence that the submitted query indicates a desire to receive a set of steps for completing a task indicated by the query. For example, if a query includes an inquiry term and a task term, then the query score of the query may satisfy the threshold. The how-to query response system 130 may access content database 120 to identify the associated determined set of steps and provide such steps in response to the submitted query.

As discussed, in some implementations the query score may be based on a sequence of queries. For example, a first query that includes a task term but does not include an inquiry term may not be identified as a how-to query and may be associated with a query score that does not satisfy the threshold query score. However, the user may submit a subsequent query that includes a task term that is similar to the task term of the first query (optionally in combination with an inquiry term). The query score for the subsequent query may take into account the first query and may satisfy the threshold query score. In some implementations the subsequent query immediately follows the first query. In some implementations the subsequent query may be within a threshold number of queries of the first query and/or submitted within a threshold of time of the first query. One or more additional subsequent queries may increase the confidence level of a query sequence and accordingly increase query scores for such subsequent queries. The how-to query response system 130 may access content database 120 to identify the associated determined set of steps and provide that in response to a query that satisfies the threshold query score.

The query score may be determined based on one or more additional and/or alternative factors. For example, standing alone, a given query that includes a task term but does not include an inquiry term may be associated with a query score that fails to satisfy the threshold query score. However, one or more user activities (e.g., purchase history, an email, and/or a post on a social media platform) may indicate that the user is likely to seek steps related to completing the task. The query score may be adjusted based on one or more such user activities to be more likely to satisfy the threshold query score. For example, purchase history of a user may indicate that the user has recently bought some tar. When taken in combination with a task term such as "remove tar", it may be inferred that the user is searching for information related to tar removal. Accordingly, the query score for the given query may be adjusted to reflect a query score more indicative of confidence that the user is searching for steps related to removing tar.

As another example, a given query may include a task term such as "change tire". Based solely on such given query, the scoring system 135 may associate a query score with the given query that fails to satisfy the threshold query score. However, user data may indicate that the user posted a comment on a social media platform that stated "stuck in the middle of nowhere with a flat tire" and/or posted an image of a flat tire. When taken in combination with the given query "change tire", it may be inferred that the user is searching for information related to changing a flat tire. Accordingly, the query score for the given query may be adjusted to reflect a query score that is more likely to satisfy the threshold query score.

In some implementations if a query score for a given query fails to satisfy a threshold query score, the how-to query response system 130 may prompt the user to see if the user desires steps related to completing a task identified by the given query. For example, the given query may include a task term such as "change tire". In some implementations the how-to query response system 130 may prompt the user to determine if the user is searching for a set of steps to perform the task of changing a tire. If the user responds positively, then the set of steps may be provided. In some implementations user responses to such prompts may be stored in a database such as content database 120. If the number of positive user responses satisfies a certain threshold, then the given query may be associated with a query score more indicative of confidence that the given query is a how-to query. If the number of positive user responses fails to satisfy a certain threshold and/or the number of negative user responses satisfies a certain threshold, then the given query may be associated with a query score less indicative of confidence that the given query is a how-to query.

In some implementations the query score for a given query and the relevance score for a determined set of steps (optionally modified based on the quality measure) related to the given query may be utilized in combination with one another to determine whether the determined set of steps may be provided in response to the given query. For example, if both the query score for the given query and the relevance score for the determined set of steps related to the given query satisfy certain respective thresholds, then the determined set of steps may be provided in response to the given query. On the other hand, if both the query score for the given query and the relevance score for the determined set of steps related to the given query fail to satisfy certain respective thresholds, then the determined set of steps may not be provided in response to the given query. As another example, if the query score for the given query satisfies a certain first threshold and the relevance score for the determined set of steps related to the given query fails to satisfy a certain second threshold, then the how-to query response system 130 may prompt the user to determine if the user is willing to receive the determined set of steps that are below the certain threshold. Based on the response to the prompt, the determined set of steps may or may not be provided in response to the given query. As another example, if the query score for the given query fails to satisfy a certain first threshold and the relevance score for the determined set of steps related to the given query satisfies a certain second threshold, then the how-to query response system 130 may prompt the user to determine if the user is searching for a set of steps related to performing a task. Based on the response to the prompt, the determined set of steps may or may not be provided in response to the given query. As another example, if the query score for the given query fails to satisfy a certain first threshold and the relevance score for the determined set of steps related to the given query indicates the set of steps are of very high quality, then the how-to query response system 130 may provide the set of steps.

In some implementations if a relevance score associated with steps responsive to a given query fails to satisfy a threshold relevance score or if a given query is not associated with steps, the how-to query response system 130 may prompt the user for additional information to enable formulation of a query that will return steps that satisfy a threshold relevance score. For example, a query of "how do I find my car oil filter" may be associated with a set of steps that have a low relevance score due to various car model specific oil filter placements. The how-to query response system 130 may prompt the user for additional information such as the car model, make, and/or year to enable formulation of a refined query that is associated with steps that satisfy a threshold relevance score.

In some implementations where a number and/or percentage is utilized to determine a confidence measure, a relevance score, a quality measure, and/or a query score, the scoring system 135 may identify a threshold number and/or percentage to determine if the confidence measure, the relevance score, the quality measure and/or the query score satisfy such threshold. In some implementations the threshold may be a fixed threshold. In some implementations the threshold may be based on one or more of the task identified by the how-to query, the source, and the corpus of documents. For example, statistical analysis may be performed on a corpus of all documents related to a how-to query to determine a statistically significant threshold.

In situations in which the systems discussed herein collect personal information about users, or may make use of personal information, the users may be provided with an opportunity to control whether programs or features collect user information (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

The content database 120, the how-to query response system 130, the scoring system 135, and/or the search system 140 and/or may be implemented in hardware, firmware, and/or software running on hardware. For example, one or more of the systems may be implemented in one or more computer servers.

Many other configurations are possible having more or fewer components than the environment shown in FIG. 1. For example, in some environments the how-to query response system 130 may include a scoring system 135. In some environments the how-to query response system 130 and the scoring system 135 may be separate components.

Figure 6:
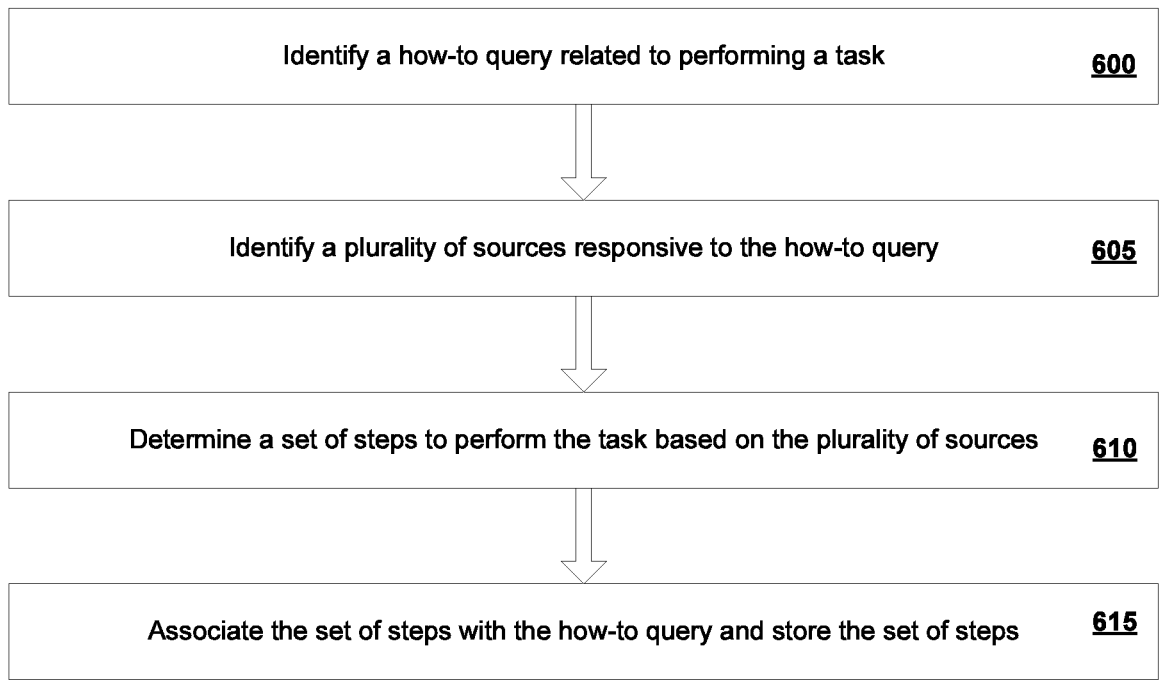
FIG. 6 is a flow chart illustrating an example method of associating a set of steps for performing a task with a how-to query and storing the set of steps to be provided in response to the how-to query.

Referring to FIG. 6, a flow chart illustrates an example method of associating the set of steps for performing a task with a how-to query and storing the set of steps to be provided in response to the how-to query. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, the how-to query response system 130 and/or the scoring system 135 of FIG. 1.

At step 600, a how-to query related to performing a task may be identified. In some implementations the how-to query may be identified based on one or more techniques described herein. For example, the how-to query may be identified based on one or more terms of the query such as inquiry terms and/or task terms.

At step 605, a plurality of sources responsive to the how-to query may be identified. In some implementations content database 120 may include identifiers (e.g., an address) of sources that are responsive to identified how-to queries. For example, the search system 140 may identify search result documents that are responsive to a how-to query. An identifier for one or more of the search result documents may then optionally be associated with the how-to query in the content database 120. The sources may include search result documents associated with the how-to query search results and/or other documents that are responsive to the how-to query. In some implementations the identified sources may be associated with a confidence measure and/or a confidence measure of the sources may be determined. The confidence measure may be indicative of the effectiveness of the given source in providing correct completion steps for the task of the how-to query.

At step 610, a set of steps to perform the task of the how-to query may be determined based on the plurality of sources. In some implementations the steps may be determined based on one or more sources in the plurality of sources. For example, the set of steps may be determined from an identified user manual. Also for example, the steps to change a car tire and replace it with a spare tire may be determined from the car's user manual. Also, for example, the set of steps may be determined based a non-user manual source with a comprehensive set of instructions to perform the task. Also, for example, the set of steps may be determined based on analysis of steps from multiple sources. For example, as described herein, groups of steps may be determined with each of the groups including similar steps from one or more sources. The set of steps may be determined based on such groups of steps.

In some implementations a given source may not provide the information needed to perform a task in the form of a set of steps. Instead the information may be provided in the form of one or more paragraphs and/or other text segments. In such instances, the how-to query response system 130 may determine the steps based on the content of the paragraphs and/or other text segments. For example, in some implementations a given sentence in a paragraph may be parsed into more than one step. Also, for example, two or more sentences in a paragraph may be merged together to form a step. One or more natural language processing techniques may be optionally utilized to segment a paragraph or other text segment into steps that perform at least a portion of the task. For example, key terms and/or key phrases may be identified along with their parts of speech. A parse tree may be determined that links key terms and/or phrases in one or more sentences based on their syntactic and/or semantic relationships. In some implementations a context-free grammar may be utilized to structure a sentence from the parse tree. Transitional terms such as "first", "next", "followed by", "after", "at the outset", "finally", etc. may be optionally utilized to segment a paragraph and/or a sentence.

At step 615, the set of steps may be associated with the how-to query. In some implementations the identified how-to query, the corresponding determined set of steps and their association may be stored in content database 120. In some implementations the determined set of steps may be associated with additional how-to queries that are similar to the identified how-to query. For example, if the identified how-to query is "how to remove tar from clothing" the determined set of steps may additionally be associated with queries such as "how can I remove tar from clothing" and "how do I remove tar from a shirt" and/or "how can I remove tar from [X]", wherein "[X]" is a variable that represents an article of clothing. Additionally and/or alternatively, one or more attributes associated with the set of steps may be stored in content database 120. In some implementations the set of steps may be provided in response to a how-to query. For example, users may issue a how-to query with the search system 140 through one or more client devices 110. The search system 140 may receive how-to queries from one or more client devices 110 and may execute the how-to queries against a content database 120 of stored steps and/or associated attributes. The search system 140 may identify the determined set of steps and/or attributes associated with the issued how-to query, and may respond by generating search results that are provided to the one or more client devices 110 in a form that can be presented to the users.

Figure 7:
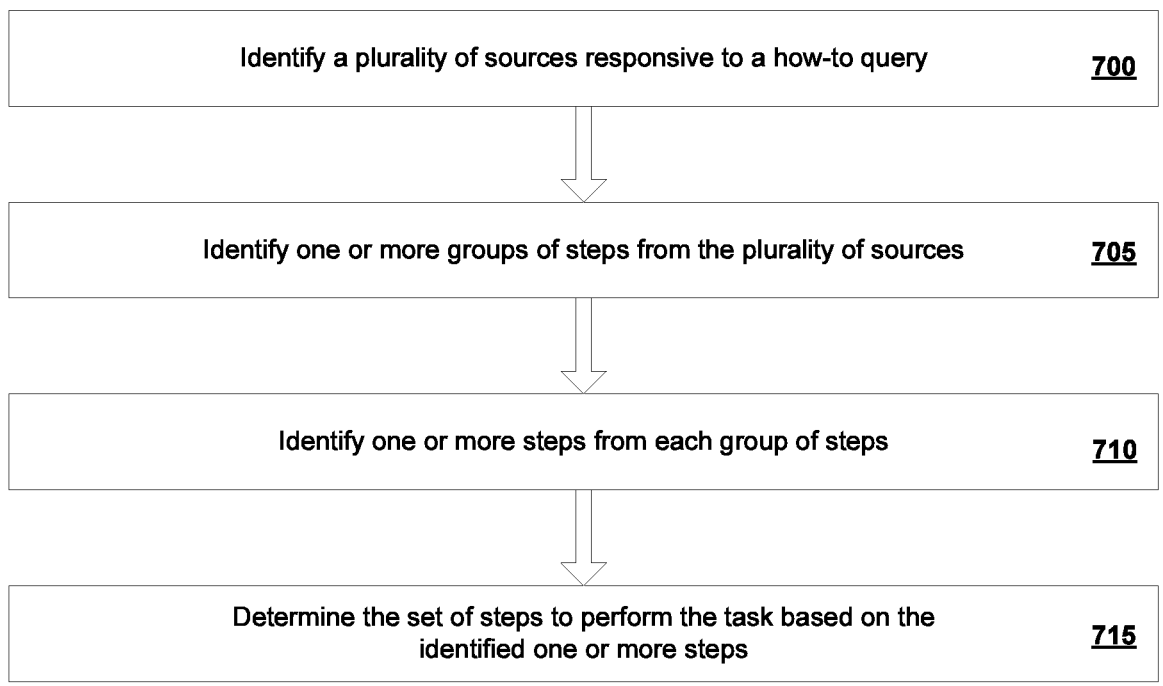
FIG. 7 is a flow chart illustrating an example method of determining the set of steps to perform a task.

Referring to FIG. 7, a flow chart illustrates an example method of determining the set of steps to perform a task. Other implementations may perform the steps in a different order, omit certain steps, and/or perform different and/or additional steps than those illustrated in FIG. 7. For convenience, aspects of FIG. 7 will be described with reference to a system of one or more computers that perform the process. The system may include, for example, the how-to query response system 130 of FIG. 1.

At step 700, a plurality of sources responsive to a how-to query may be identified. In some implementations the sources may include a user manual that is responsive to the how-to query. For example, a user manual for a car may include instructions on how to replace the car's tire with a spare tire. As another example, a user manual for a client device 110 may include instructions to assist the user with the initial configuration of the device and/or assist the user in troubleshooting common problems. In some implementations the sources may include additional and/or alternative sources such as how-to webpages, forums, articles, etc. In some implementations step 700 may share one or more attributes in common with step 605 of FIG. 6.

At step 705, one or more groups of steps may be identified from the plurality of sources. For example, source A may include three steps {A1, A2, A3}, source B may include four steps {B1, B2, B3, B4} and source C may include three steps {C1, C2, C3}. The how-to query response system 130 may identify one or more groups of steps from these sources. For example, a first group of steps may be identified as {A1, B1, B2, C1}, a second group of steps may be identified as {A2, B3, C2}, and a third group of steps may be identified as {A3, B4, C3}. In some implementations each identified group of steps may be representative of a common action needed to perform the task. For example, the first group of steps {A1, B1, B2, C1} may be representative of the action "apply ice cubes".

In some implementations the scoring system 135 may determine similarity measures between two or more identified steps in determining if they are representative of a common action. For example, a pair of steps (in a single source and/or one from each of two sources) may be grouped together if the similarity measure for the pair is indicative of a high degree of similarity; whereas a pair of steps may be grouped separately if the similarity measure for the pair is indicative of a low degree of similarity.

At step 710, one or more steps may be identified from each group. The one or more steps may be selected based on a variety of factors. In some implementations the steps in each group may be ranked and the how-to query response system 130 may select one or more steps from each group of steps based on the ranking. For example, source A may include three steps {A1, A2, A3}, source B may include four steps {B1, B2, B3, B4} and source C may include three steps {C1, C2, C3}. The how-to query response system 130 may identify one or more groups of steps from these sources. For example, three groups of steps may be identified and the steps within each group may be ranked as {A1, B1, B2, C1}, {B3, A2, C2}, and {C3, A3, B4}. The how-to query response system 130 may select the highest ranked step in each group to determine the set of steps. For example, the set of steps may be determined as: {A1, B3, C3}.

At step 715, the set of steps to perform the task may be determined based on the identified one or more steps. In some implementations the ordering of the set of steps to perform the task may be determined based on the ordering of corresponding steps in one or more sources. For example, the steps in a first group of steps may precede the steps in a second group of steps in one or more sources from which the steps are derived and be ordered accordingly. For example, step A1 may be selected to include in the set of steps from the group of steps {A1, B1, C1}. Step A1 may be identified as the first step in the set of steps based on A1 being the first step in source A and/or steps B1 and/or C1 being the first steps in respective of sources B and C. In some implementations one or more groups of steps may be optionally ranked and the how-to query response system 130 may order the set of steps additionally and/or alternatively based on such ranking. For example, the set of steps may be ordered based on respective relevance scores for groups of steps from which the set of steps is derived, as discussed herein.

In some implementations the scoring system 135 may determine a relevance score for each of one or more steps within each group of steps and may rank the steps in the group of steps based on the relevance scores. The ranking of the steps may be utilized in selecting a step from the group of steps, formulating a step based on the group of steps, and/or determining an order of the selected step based on the group in the determined set of steps. In some implementations the relevance score for a step may be indicative of confidence that the step is an appropriate step for completing the task identified by the how-to query. The relevance score for a step may be determined based on one or more methods utilized to determine the confidence measures of a source of the step as described herein. For example, key terms and/or key phrases appearing in a step may be matched to key terms and/or key phrases that may be associated with the task identified by the how-to query. A step that more closely matches the task identified by the how-to query may be associated with a relevance score more indicative of relevance to the task. For example, a step from a first source may be "scrape the hardened tar off the shirt" and it may be in an identified group with a step from a second source that may be "scrape the hardened tar off the fabric". The step of "scrape the hardened tar off the shirt" may have a higher relevance score to the how-to query of "how to remove tar from a shirt" than would the step of "scrape the hardened tar off the fabric". Matching may be based on soft matching, exact matching, determining semantic distance, and/or determining distributional similarities between the respective key terms and/or key phrases.

Figure 8:
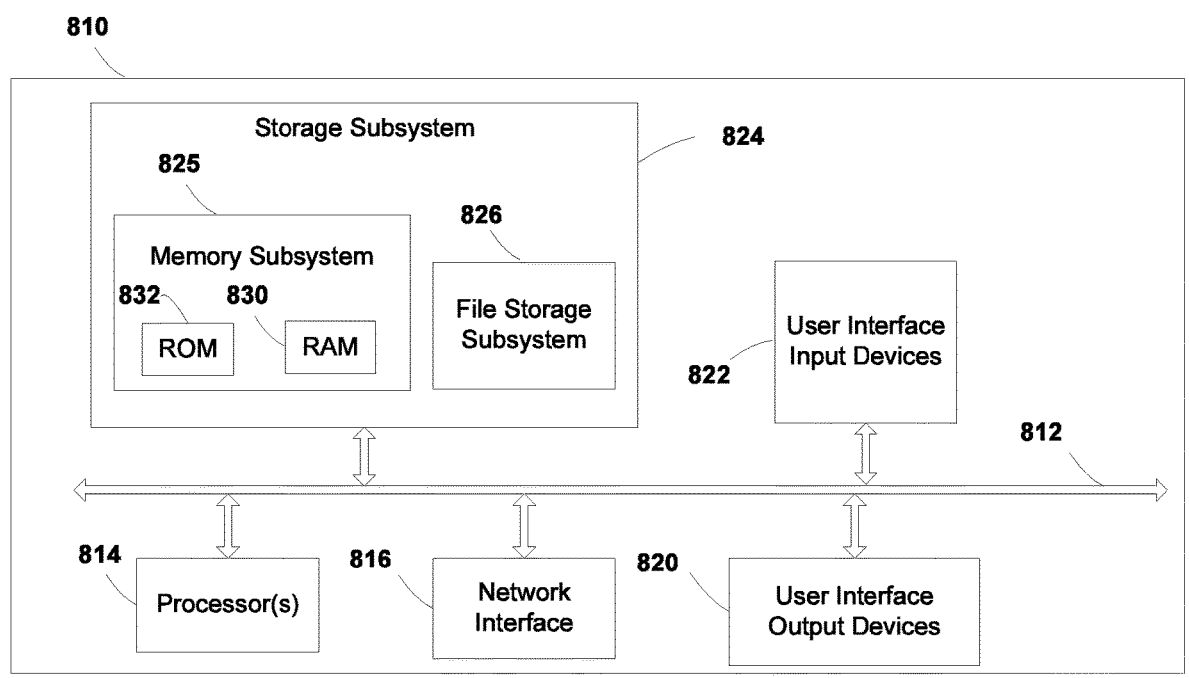
FIG. 8 illustrates a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to determine the set of steps that may be associated with a how-to query. As another example, the storage subsystem 824 may include the logic to associate a how-to query with a determined set of steps.

These software modules are generally executed by processor 814 alone or in combination with other processors. Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 828 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein in the specification and in the claims, the term "database" will be used broadly to refer to any collection of data. The data of the database does not need to be structured in any particular way, or structured at all, and it can be stored on storage devices in one or more geographic locations.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method implemented by one or more processors, comprising:
    generating a set of steps, wherein the set of steps comprises an enumerated listing of instructions that assist users in performing a task, and wherein generating the set of steps comprises:
        identifying, from a first search result document and a second search result document that are responsive to a search query, and based on the first search result document and the second search result document both being included in a threshold quantity of highest ranked search result documents for the search query, at least:
            a first set of steps from the first document, and
            a second set of steps from the second document and
        generating the set of steps based on both the first set of steps from the first document and the second set of steps from the second document
    storing an association of the set of steps with the search query;
    subsequent to storing the association, and in response to receiving a first submission of the search query:
        identifying the set of steps as responsive to the search query based on the stored association of the set of steps with the search query;
        identifying additional search results that are responsive to the search query, each of the additional search results being associated with a corresponding search result document;
        determining to provide the additional search results in response to the first submission of the search query without also providing the set of steps in response to the first submission of the search query; and providing the additional search results in response to the first submission of the search query without also providing the set of steps; and subsequent to storing the association, and in response to receiving a second submission of the search query from a client device of a user:

determining to provide the set of steps in response to the second submission of the search query, wherein determining to provide the set of steps in response to the second submission of the search query is based on identifying that the user performed, prior to the second submission of the search query, one or more past computing interactions that are indicative of the set of steps, wherein the one or more past computing interactions include at least one action that is in addition to a search query issuance action and that is in addition to a search result selection action; and providing the set of steps to the client device in response to the second submission of the search query, wherein providing the set of steps to the client device comprises providing the set of steps for display above any of the additional search results.

2. The method of claim 1, further comprising:
in response to the second submission of the search query, providing the additional search results to the client device for presentation in combination with the set of steps.

3. The method of claim 2, wherein providing the additional search results to the client device for presentation in combination with the set of steps comprises providing the additional search results for less prominent presentation than the set of steps.

4. The method of claim 1, wherein the one or more past computing interactions include a download initiated by the user or an email interaction.

5. The method of claim 1, wherein the one or more past computing interactions include a past electronic communication of the user.

6. The method of claim 1, wherein the one or more past computing interactions include navigation to one or more electronic resources, by the user via the client device, that are related to a task of the search query.

7. The method of claim 1, wherein determining to provide the additional search results in response to the first submission of the search query without also providing the set of steps in response to the first submission of the search query is based on:
the set of steps being stored in association with the search query, and a relevance score being stored for the association of the set of steps with the search query, and determining that the relevance score fails to satisfy a threshold.

8. A computing system, comprising:
at least one processor; and
at least one computer-readable storage device storing instructions that, when executed by the at least one processor, cause the at least one processor to:
generate a set of steps, wherein the set of steps comprises an enumerated listing of instructions that assist users in performing a task, and wherein the instructions to generate the set of steps further cause the at least one processor to:
identify, from a first search result document and a second search result document that are responsive to a search query, and based on the first search result document and the second search result document both being included in a threshold quantity of highest ranked search result documents for the search query, at least:
a first set of steps from the first document, and
a second set of steps from the second document; and
generate the set of steps based on both the first set of steps from the first document and the second set of steps from the second document;

subsequent to storing the association, and in response to receiving a first submission of the search query:
identify the set of steps as responsive to the search query based on the stored association of the set of steps with the search query;
identify additional search results that are responsive to the search query, each of the additional search results being associated with a corresponding search result document;
determine to provide the additional search results in response to the first submission of the search query without also providing the set of steps in response to the first submission of the search query; and
provide the additional search results in response to the first submission of the search query without also providing the set of steps; and subsequent to storing the association, and in response to receiving a second submission of the search query from a client device of a user:
determine to provide the set of steps in response to the second submission of the search query, wherein determining to provide the set of steps in response to the second submission of the search query is based on identifying that the user performed, prior to the second submission of the search query, one or more past computing interactions that are indicative of the set of steps,
wherein the one or more past computing interactions include at least one action that is in addition to a search query issuance action and that is in addition to a search result selection action; and
provide the set of steps to the client device in response to the second submission of the search query, wherein providing the set of steps to the client device comprises providing the set of steps for display above any of the additional search results.

9. The computing system of claim 8, wherein the instructions, when executed by the at least one processor, further cause the at least one processor to:
in response to the second submission of the search query, provide the additional search results to the client device for presentation in combination with the set of steps.

10. The computing system of claim 9, wherein the instructions to provide the additional search results to the client device for presentation in combination with the set of steps comprise instructions to provide the additional search results for less prominent presentation than the set of steps.

11. The computing system of claim 8, wherein the one or more past computing interactions include a download initiated by the user or an email interaction.

12. The computing system of claim 8, wherein the one or more past computing interactions include a past electronic communication of the user.

13. The computing system of claim 8, wherein the one or more past computing interactions include navigation to one or more electronic resources, by the user via the client device, that are related to a task of the search query.

14. The computing system of claim 8, wherein the instructions to determine to provide the additional search results in response to the first submission of the search query without also providing the set of steps in response to the first submission of the search query is based on:
the set of steps being stored in association with the search query, and a relevance score being stored for the association of the set of steps with the search query, and determining that the relevance score fails to satisfy a threshold.

15. The method of claim 1, further comprising:
determining a first query score for the first submission of the search query,
wherein determining to provide the additional search results in response to the first submission of the search query without also providing the set of steps in response to the first submission of the search query is based on the first query score;
determining a second query score for the second submission of the search query,
wherein determining the second query score comprises determining the second query score based on the one or more past computing interactions, and
wherein the second query score differs from the first query score based on the one or more past computing interactions; and
wherein determining to provide the set of steps in response to the second submission of the search query is based on the second query score.

* * * * *